(12) United States Patent
Huang et al.

(10) Patent No.: US 10,683,006 B2
(45) Date of Patent: Jun. 16, 2020

(54) APPARATUS AND METHODS FOR OBSTACLE DETECTION

(71) Applicant: SZ DJI TECHNOLOGY Co., Ltd, Shenzhen (CN)

(72) Inventors: Jinzhu Huang, Shenzhen (CN); Cong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 354 days.

(21) Appl. No.: 15/274,211

(22) Filed: Sep. 23, 2016

(65) Prior Publication Data

US 2017/0225680 A1    Aug. 10, 2017

Related U.S. Application Data

(63) Continuation of application No. PCT/CN2015/078792, filed on May 12, 2015.

(51) Int. Cl.
*B60W 30/09* (2012.01)
*B60T 8/1755* (2006.01)
(Continued)

(52) U.S. Cl.
CPC ......... *B60W 30/09* (2013.01); *B60R 21/0134* (2013.01); *B60T 7/22* (2013.01);
(Continued)

(58) Field of Classification Search
CPC .......... G08G 1/16; G08G 1/166; G08G 1/161; G08G 1/165; G08G 1/163; G08G 1/168; G08G 1/162; G08G 5/04; G01S 3/12; G01S 15/025; G01S 15/931; G01S 17/936; G01S 13/931; G01S 5/0072; B60Q 1/00; B60Q 9/008; G06K 9/00; G06K 9/00805; G06K 9/00362; H04N 5/33; B60W 30/09;
(Continued)

(56) References Cited

U.S. PATENT DOCUMENTS 7,478,578 B2    1/2009 Kickpatrick
7,876,258 B2    1/2011 Abraham et al.
(Continued)

FOREIGN PATENT DOCUMENTS

CN    102533288 A    7/2012
CN    202320088 U    7/2012
(Continued)

OTHER PUBLICATIONS

Dengrong Liu, et al., Equipment, Weapon Dictionary, 1988, pp. 331-332, Rural Reading Press, China. Accessed on Nov. 6, 2019.
(Continued)

*Primary Examiner* — Behrang Badii
(74) *Attorney, Agent, or Firm* — Anova Law Group, PLLC

(57) ABSTRACT

Systems, apparatuses and methods for recognizing or detecting obstacles are provided. Passive infrared (PIR) sensors may be coupled to movable objects, such as unmanned aerial vehicles (UAVs). PIR sensors may detect and recognize obstacles such as humans and determine or calculate a distance to the obstacles. Based on the distance from the movable object to the obstacle, one or more flight response measures such as collision avoidance maneuvers may be effected or implemented.

10 Claims, 11 Drawing Sheets

(51) Int. Cl.
*B60T 7/22* (2006.01)
*B60R 21/0134* (2006.01)
*B60W 10/04* (2006.01)
*B60W 10/18* (2012.01)
*B64C 39/02* (2006.01)
*G01V 8/10* (2006.01)
*G05D 1/00* (2006.01)
*G08G 5/04* (2006.01)
*B60R 21/01* (2006.01)

(52) U.S. Cl.
CPC ......... *B60T 8/17558* (2013.01); *B60W 10/04* (2013.01); *B60W 10/18* (2013.01); *B64C 39/024* (2013.01); *G01V 8/10* (2013.01); *G05D 1/0094* (2013.01); *G08G 5/04* (2013.01); *B60R 2021/01013* (2013.01); *B60T 2201/022* (2013.01); *B60T 2210/32* (2013.01); *B60W 2550/10* (2013.01); *B64C 2201/127* (2013.01); *B64C 2201/185* (2013.01)

(58) Field of Classification Search
CPC .... B60W 50/16; B60W 50/082; B60W 10/20; B60W 10/184; B60W 30/08; B60W 30/06; B60W 10/04; B60W 10/18; B60W 2550/10; B62J 27/00; B62M 27/00; A42B 3/046; G05D 1/0011; G05D 1/0022; G05D 1/0278; G05D 1/021; G05D 1/0088; G05D 1/0094; G01C 21/3407; G01C 21/3469; G01C 21/3679; G06Q 10/02; G06Q 10/20; G06Q 20/18; G06Q 30/0643; G06Q 30/0645; G06Q 50/06; G06Q 30/0201; G07F 15/005; B60L 3/0015; B60L 53/14; B60L 53/80; B60L 53/31; B60L 53/65; B60L 53/665; B60L 58/12; B60L 50/66; B60L 53/305; B60L 53/68; G07C 5/02; G07C 5/008; B62D 15/029; H04W 4/024; B60R 21/0134; B60R 2021/01013; B60T 7/22; B60T 8/17558; B60T 2201/022; B60T 2210/32; B64C 39/024; B64C 2201/127; B64C 2201/185; G01V 8/10
See application file for complete search history.

(56) References Cited

U.S. PATENT DOCUMENTS

| | | | |
|---|---|---|---|
| 8,316,555 B2 | 11/2012 | Goossen et al. | |
| 8,378,881 B2 | 2/2013 | Lemire et al. | |
| 8,543,265 B2 | 9/2013 | Ekhaguere et al. | |
| 8,833,231 B1 | 9/2014 | Venema | |
| 9,697,733 B1* | 7/2017 | Penilla | G05D 1/0011 |
| 9,718,405 B1* | 8/2017 | Englander | G01S 19/13 |
| 2002/0080495 A1 | 6/2002 | Anderson | |
| 2005/0190047 A1* | 9/2005 | Lemke | B60Q 9/008 340/435 |
| 2008/0097699 A1* | 4/2008 | Ono | B60R 21/0134 701/300 |
| 2009/0294573 A1 | 12/2009 | Wilson et al. | |
| 2010/0020170 A1* | 1/2010 | Higgins-Luthman | B60Q 1/1423 348/135 |
| 2015/0254985 A1* | 9/2015 | Fisher | G08G 1/166 348/148 |

FOREIGN PATENT DOCUMENTS

| | | |
|---|---|---|
| CN | 102756730 A | 10/2012 |
| CN | 203480702 U | 3/2014 |
| CN | 103692993 A | 4/2014 |
| CN | 103879404 A | 6/2014 |
| CN | 104002780 A | 8/2014 |

OTHER PUBLICATIONS

The World Intellectual Property Organization (WIPO), International Search Report and Written Opinion for PCT/CN2015/078792, dated Feb. 14, 2016, 6 pages.

* cited by examiner

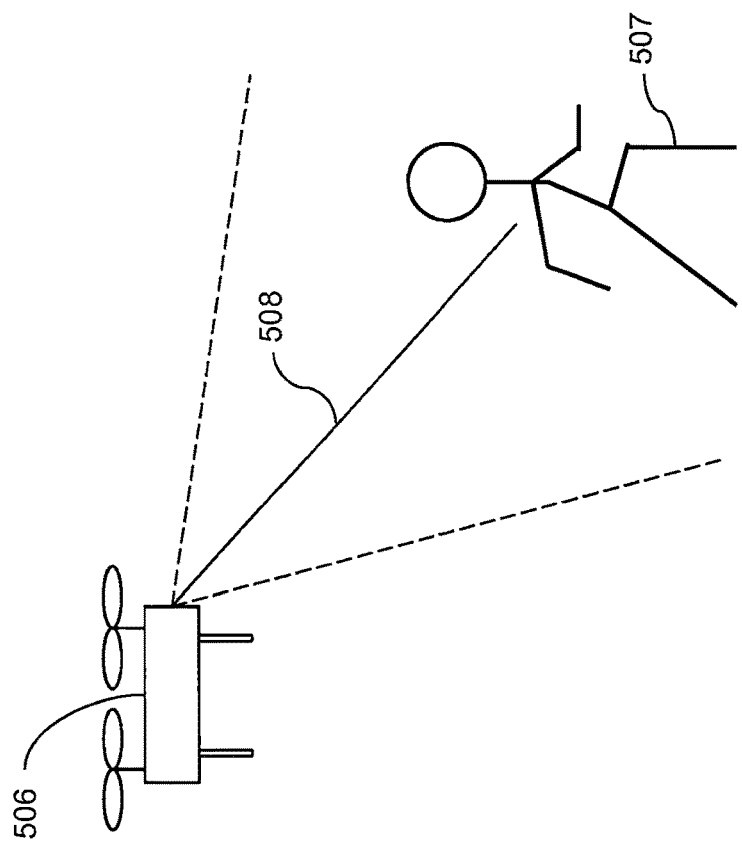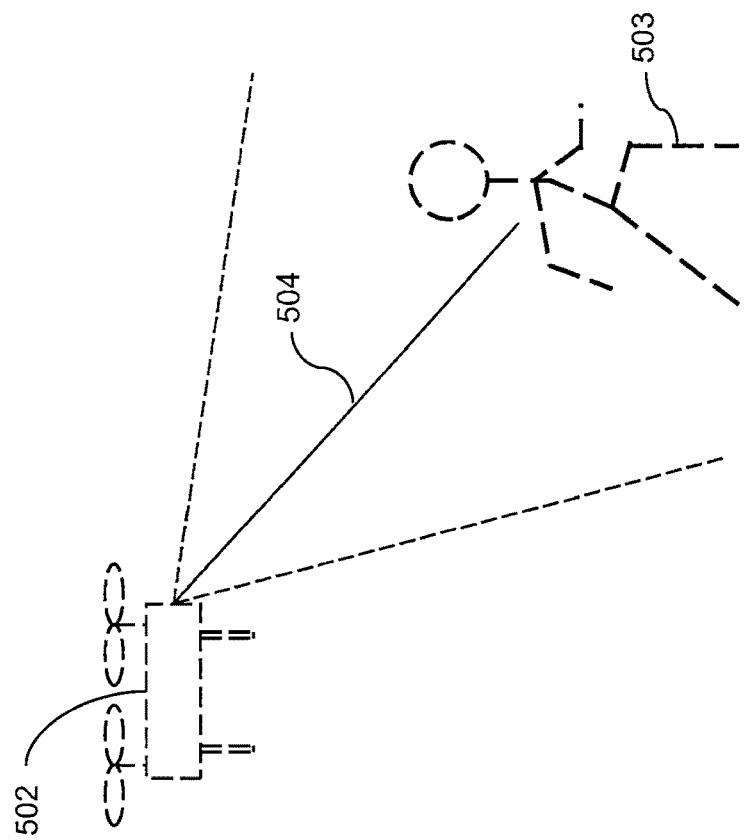
FIG. 5

APPARATUS AND METHODS FOR OBSTACLE DETECTION

CROSS-REFERENCE

This application is a continuation of International Application No. PCT/CN2015/078792, filed on May 12, 2015. The above-referenced application is hereby incorporated by reference.

BACKGROUND OF THE INVENTION

Movable objects, such as unmanned aerial vehicles (UAVs), can be used for performing surveillance, reconnaissance, and exploration tasks in a wide variety of environments for both military and civilian applications. Such movable objects may operate in close proximity to obstacles (e.g., objects or subjects such as human beings) and in instances may come into contact with the obstacles. Collision with humans, animals, or objects may lead to injury, damage (e.g., to objects or the UAV) or failure of operations UAVs are tasked with. To avoid collision, UAVs may include sensors configured for obstacle avoidance.

Existing approaches for obstacle avoidance may be less than optimal in some instances. For example, collision avoidance utilizing vision sensors may be disabled or limited in dim or dark light and may utilize complicated algorithms requiring costly CPUs. For example, collision avoidance utilizing lidar sensors may deteriorate in an outdoor environment due to sunlight and may operate under a complex mechanism requiring many parts (e.g., laser head, rotating device, camera, processors, etc).

SUMMARY

Embodiments disclosed herein provide apparatuses and methods of recognizing or detecting obstacles. In many embodiments, passive infrared (PIR) sensors may be provided on movable objects and may be used to detect or recognize obstacles. The obstacles may comprise any objects or subjects within an environment. PIR sensors may generate data based on thermal signals from the obstacle, and a distance from the movable object to the obstacle may be determined or calculated based on the data. Based on factors such as the distance from the movable object to the obstacle, an appropriate flight response measure may be determined. Advantageously, the approaches described herein may provide improved and efficient collision avoidance for movable objects, especially with regards to obstacles with particular thermal signals (e.g., for subjects such as human beings).

Thus, in one aspect, a method of recognizing an obstacle is provided. The method comprises: receiving, with aid of a passive infrared sensor on board a movable object, one or more heat signals from the obstacle; calculating, with aid of a processor, a distance from the movable object to the obstacle based on data from the passive infrared sensor; and determining, based on the distance, whether to effect a collision avoidance maneuver for the movable object to avoid the obstacle.

In some embodiments, the method further comprises effecting the collision avoidance maneuver when a determination is made to effect a collision avoidance maneuver based on the distance. In some embodiments, the method further comprises recognizing the obstacle based on the heat signal detected using the passive infrared sensor. In some embodiments, the movable object is an unmanned aerial vehicle (UAV). In some embodiments, the passive infrared sensor receives the heat signal after the heat signal has passed through an optical element. In some embodiments, the optical element is a Fresnel lens. In some embodiments, the recognition of the obstacle includes differentiating the obstacle from different types of obstacles based on the heat signal. In some embodiments, the obstacle is a human, and the heat signal from the human is recognizable as belonging to a human. In some embodiments, the heat signal is about 10 um in wavelength. In some embodiments, the determination whether to effect the collision avoidance maneuver is also made based on a speed and direction of the movable object and/or the obstacle. In some embodiments, the collision avoidance maneuver includes braking. In some embodiments, the collision avoidance maneuver includes altering a direction of a moving course of the movable object. In some embodiments, the collision avoidance maneuver includes stopping one or more propulsion units of the movable object. In some embodiments, the collision avoidance maneuver includes deploying one or more airbags. In some embodiments, the collision avoidance maneuver includes deploying one or more parachutes.

In another aspect, an apparatus for detecting an obstacle is provided. The apparatus comprises: a passive infrared sensor on board a movable object, said passive infrared sensor configured to receive one or more heat signals from the obstacle; and one or more processors, collectively or individually configured to: calculate a distance from the movable object to the obstacle based on data from the passive infrared sensor; and determine whether to effect a collision avoidance maneuver for the movable object to avoid the obstacle based on the distance.

In some embodiments, the one or more processors are configured to effect the collision avoidance maneuver when a determination is made to effect a collision avoidance maneuver based on the distance. In some embodiments, the one or more processors are configured to recognize the obstacle based on the one or more heat signals received by the passive infrared sensor. In some embodiments, the movable object is an unmanned aerial vehicle (UAV). In some embodiments, the passive infrared sensor receives the heat signal after the heat signal has passed through an optical element. In some embodiments, the optical element is a Fresnel lens. In some embodiments, the one or more processors are configured to differentiate the obstacle from different types of obstacles based on the heat signal. In some embodiments, the obstacle is a human, and the heat signal from the human is recognizable as belonging to a human. In some embodiments, the heat signal is about 10 um in wavelength. In some embodiments, the one or more processors are configured to determine whether to effect the collision avoidance maneuver based on the distance and on a speed and direction of the movable object and/or the obstacle. In some embodiments, the collision avoidance maneuver includes braking. In some embodiments, the collision avoidance maneuver includes altering a direction of a moving course of the movable object. In some embodiments, the collision avoidance maneuver includes stopping one or more propulsion units of the movable object. In some embodiments, the collision avoidance maneuver includes deploying one or more airbags. In some embodiments, the collision avoidance maneuver includes deploying one or more parachutes.

In another aspect, a method of recognizing an obstacle is provided. The method comprises: providing a plurality of passive infrared sensors on-board a movable object, each passive infrared sensor of said plurality having a different field of view; receiving, with aid of at least one passive infrared sensor of said plurality, a heat signal from the obstacle; recognizing the obstacle based on the heat signal received using the passive infrared sensor; and determining, based on data from the passive infrared sensor, whether to effect a collision avoidance maneuver for the movable object to avoid the obstacle.

In some embodiments, a collective field of view of the plurality of infrared sensors covers a 360 angle around the movable object. In some embodiments, the 360 angle covers a panoramic view of the lateral sides of the movable object. In some embodiments, a collective field of view of the plurality of passive infrared sensors covers an entire spherical region around the movable object. In some embodiments, the movable object is an unmanned aerial vehicle (UAV). In some embodiments, the method further comprises effecting the collision avoidance maneuver when a determination is made to effect a collision avoidance maneuver based on a distance from the movable object to the obstacle. In some embodiments, the infrared sensor receives the heat signal after the heat signal has passed through an optical element. In some embodiments, the optical element is a Fresnel lens. In some embodiments, the recognition of the obstacle includes differentiating the obstacle from different types of obstacles based on the heat signal. In some embodiments, the obstacle is a human, and the heat signal from the human is recognizable as belonging to a human. In some embodiments, the heat signal is about 10 um in wavelength. In some embodiments, the determination whether to effect the collision avoidance maneuver is made based on a speed and direction of the movable object and/or the obstacle. In some embodiments, the collision avoidance maneuver includes braking. In some embodiments, the collision avoidance maneuver includes altering a direction of a moving course of the movable object. In some embodiments, the collision avoidance maneuver includes stopping one or more propulsion units of the movable object. In some embodiments, the collision avoidance maneuver includes deploying one or more airbags. In some embodiments, the collision avoidance maneuver includes deploying one or more parachutes.

In another aspect, an apparatus for detecting an obstacle is provided. The apparatus comprises: a plurality of passive infrared sensors on board a movable object, each passive infrared sensor of said plurality having a different field of view; and one or more processors, collectively or individually configured to: receive a signal from at least one passive infrared sensor of said plurality indicative of a heat signal from the obstacle; recognize the obstacle based on the heat signal received using the passive infrared sensor; and determine whether to effect a collision avoidance maneuver for the movable object to avoid the obstacle.

In some embodiments, a collective field of view of the plurality of infrared sensors covers a 360 angle around the movable object. In some embodiments, the 360 angle covers a panoramic view of the lateral sides of the movable object. In some embodiments, a collective field of view of the plurality of passive infrared sensors covers an entire spherical region around the movable object. In some embodiments, the movable object is an unmanned aerial vehicle (UAV). In some embodiments, the one or more processors are configured to effect the collision avoidance maneuver when a determination is made to effect a collision avoidance maneuver based on a distance from the movable object to the obstacle. In some embodiments, the infrared sensor receives the heat signal after the heat signal has passed through an optical element. In some embodiments, the optical element is a Fresnel lens. In some embodiments, the one or more processors are configured to differentiate the obstacle from different types of obstacles based on the heat signal. In some embodiments, the obstacle is a human, and the heat signal from the human is recognizable as belonging to a human. In some embodiments, the heat signal is about 10 um in wavelength. In some embodiments, the one or more processors are configured to determine whether to effect the collision avoidance maneuver based on a speed and direction of the movable object and/or the obstacle. In some embodiments, the collision avoidance maneuver includes braking. In some embodiments, the collision avoidance maneuver includes altering a direction of a moving course of the movable object. In some embodiments, the collision avoidance maneuver includes stopping one or more propulsion units of the movable object. In some embodiments, the collision avoidance maneuver includes deploying one or more airbags. In some embodiments, the collision avoidance maneuver includes deploying one or more parachutes.

In another aspect, a method for responding to a target is provided. The method comprises: receiving, with aid of one or more passive infrared sensors on board a movable object, one or more heat signals from the target; recognizing the target based on the received heat signals; performing, with aid of one or more processors, one or more flight response measures based on the recognized target.

In some embodiments, the one or more flight response measures are performed automatically with the aid of the one or more processors. In some embodiments, the method further comprises determining one or more appropriate flight response measures prior to performing one or more flight response measures based on the recognized target. In some embodiments, the method comprises determining a distance from the movable object to the target. In some embodiments, the distance is compared to a threshold distance. In some embodiments, the one or more flight response measures depend at least partly on the distance. In some embodiments, the one or more flight response comprises tracking the target. In some embodiments, tracking the target comprises following the target. In some embodiments, the target is followed at a predetermined distance. In some embodiments, the one or more flight response measures comprise sending an alert to an operator of the movable object. In some embodiments, the one or more flight response measures comprise maintaining a predetermined distance from the target. In some embodiments, the one or more flight response measures comprise triggering an imaging device to capture images. In some embodiments, the one or more flight response measures comprise a collision avoidance maneuver. In some embodiments, the collision avoidance maneuver comprises braking, altering a direction of a moving course of the movable object, stopping one or more propulsion units of the movable object, deploying one or more airbags, and/or deploying one or more parachutes. In some embodiments, the one or more passive infrared sensors individually or collectively have a 360° horizontal field of view around the movable object. In some embodiments, each of the one or more passive infrared sensors has a detection range of 5 m. In some embodiments, recognizing the target based on the detected heat signal comprises differentiating the target from different types of targets based on the heat signal. In some embodiments, the target is a human, and the heat signal from the human is recognizable as belonging to a human. In some embodiments, the heat signal is about 8-12 um in wavelength.

In another aspect, a system for responding to a target is provided. The system comprises: one or more passive infrared sensors on board a movable object, said passive infrared sensor configured to receive one or more heat signals from the target; and one or more processors, collectively or individually configured to: recognize the target based on the received heat signals; and perform one or more flight response measures based on the recognized target.

In some embodiments, the one or more processors are configured to automatically perform one or more flight response measures based on the recognized target. In some embodiments, the one or more processors are configured to determine one or more appropriate flight response measures. In some embodiments, the one or more processors are configured to determine a distance from the movable object to the target. In some embodiments, the one or more processors are configured to compare the distance to a threshold distance. In some embodiments, the one or more flight response measures depend at least partly on the distance. In some embodiments, the one or more flight response measure comprises tracking the target. In some embodiments, tracking the target comprises following the target. In some embodiments, the target is followed at a predetermined distance. In some embodiments, the one or more flight response measures comprise sending an alert to an operator of the movable object. In some embodiments, the one or more flight response measures comprise maintaining a predetermined distance from the target. In some embodiments, the one or more flight response measures comprise triggering an imaging device to capture images. In some embodiments, the one or more flight response measures comprise a collision avoidance maneuver. In some embodiments, the collision avoidance maneuver comprises braking, altering a direction of a moving course of the movable object, stopping one or more propulsion units of the movable object, deploying one or more airbags, and/or deploying one or more parachutes. In some embodiments, the one or more passive infrared sensors individually or collectively have a 360° horizontal field of view around the movable object. In some embodiments, each of the one or more passive infrared sensors has a detection range of 5 m. In some embodiments, the one or more processors are configured to differentiate the target from different types of targets based on the heat signal. In some embodiments, the target is a human, and the heat signal from the human is recognizable as belonging to a human. In some embodiments, the heat signal is about 8-12 um in wavelength.

It shall be understood that different aspects of the invention can be appreciated individually, collectively, or in combination with each other. Various aspects of the invention described herein may be applied to any of the particular applications set forth below. Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 5 illustrates a movable object tracking a target, in accordance with embodiments.

DETAILED DESCRIPTION

Methods, apparatuses, and systems of recognizing or detecting an obstacle are provided. In some embodiments, the obstacle may refer to a target, and methods, apparatuses, and systems described with respect to recognition or detection of obstacles will be understood to be equally applicable to recognition or detection of targets. The recognition or detection of obstacles may be via sensors located on board a movable object. As used herein, a movable object may refer to any object that may be moved as described elsewhere. For example, a movable object may be a mobile phone, a watch, an unmanned aerial vehicle (UAV), a car, a boat, a computer, a PDA, a tablet, etc. While many embodiments herein are described with reference to UAVs, it shall be understood that the reference is non-limiting, and that the embodiments are equally applicable to any movable object. In some instances, a distance of movable objects to obstacles may be determined with aid of one or more sensors. For example, one or more passive infrared (PIR) sensors may receive infrared radiation (e.g., heat signal or pattern) emitted or reflected from an obstacle (e.g., object or subject). The obstacle may be detected, recognized or identified based on the infrared radiation pattern and a distance from the movable object to the obstacle may be calculated based on data from the PIR sensor. Subsequently, a flight response measure may be determined and implemented based on the distance calculated.

Figure 1:
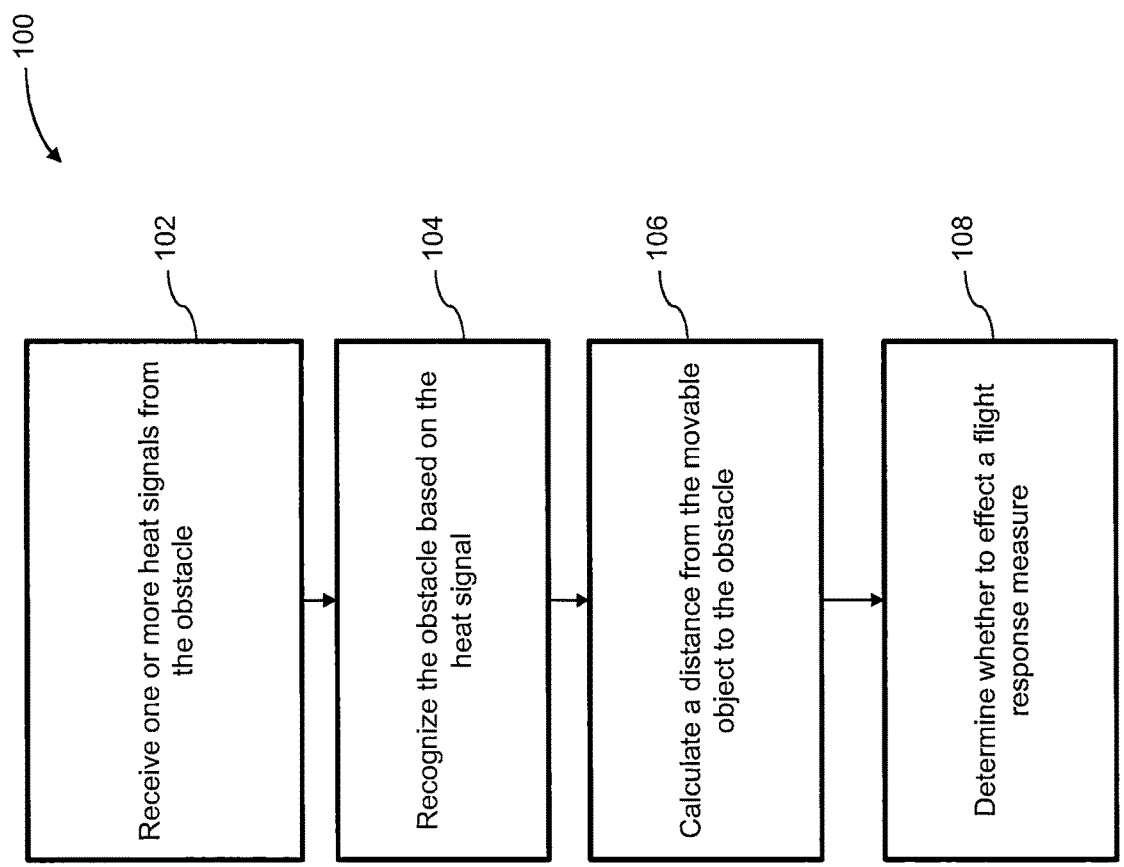
FIG. 1 illustrates a method of recognizing an obstacle, in accordance with embodiments.

FIG. 1 illustrates a method 100 of recognizing an obstacle, in accordance with embodiments. Obstacle as used herein may refer to any external factor capable of obscuring a path of a movable object (e.g., UAV) or capable of coming into contact with the movable object. The obstacle may comprise any objects or subjects. For example, the obstacle may be an object that is stationary (e.g., building, boulder, parked car, etc), mobile (e.g., moving car, plane, etc), artificial (e.g., signpost, boat, etc), and/or natural (e.g., tree, waterfall, etc). For example, the obstacle may be a subject such as an animal (e.g., cat, dog, horse, etc) or a human being.

In step 102, one or more heat signals from the obstacle may be received. Infrared radiation may also be referred to as a heat signal herein. All obstacles may have an infrared radiation energy associated with it. All obstacles may emit or reflect infrared radiation. In some instances, infrared radiation emitted or reflected from an obstacle may be received with aid of infrared (IR) sensors such as PIR sensors. PIR sensors may comprise pyroelectric materials. PIR sensors (e.g., the pyroelectric materials) may detect infrared radiation or changes in an amount of infrared radiation (e.g., emitted or reflected from the obstacle) impinging upon it. The pyroelectric materials may generate energy when exposed to the infrared radiation. For example, the PIR sensors may generate energy in response to infrared radiation 0.2-20 um in wavelength. The pyroelectric materials may generate (e.g., output) a low frequency pulse signal (e.g., voltage signal) when exposed to the infrared radiation (e.g., 0.2-20 um in wavelength). Generation of energy (e.g., a pulse signal) in response to received infrared radiation may herein be referred to as detection of infrared radiation, detection of changes in infrared radiation, and/or detection of the obstacle (e.g., emitting or reflecting the infrared radiation). The infrared radiation impinging upon the PIR sensor may depend on the temperature, shape, area, volume, and/or surface characteristics (e.g., texture) of obstacles in front of the sensor. Obstacles of similar temperature but different surface characteristics may emit different infrared radiation patterns. Obstacles of similar surface characteristics but different temperatures may emit different infrared radiation patterns. Obstacles of different temperature and different surface characteristics may emit different infrared radiation patterns. Objects of similar surface characteristics (e.g., texture) and similar temperatures may emit similar infrared radiation patterns. The output signal (e.g., pulse signal, voltage signal) by the pyroelectric materials may depend on factors beyond a presence (e.g., temperature, shape, surface characteristic, etc) of the obstacle. For example, the output signal may depend on factors such as a distance from an obstacle to the PIR sensor, a direction and speed of the obstacle (e.g., relative to the movable object), a gait (if applicable) of the obstacle, and/or presence of multiple obstacles. In some instances, characteristics of the output signal (e.g., magnitude of the output signal) in response to detection of obstacles may depend on factors such as the temperature, surface characteristics, size, area, volume of the obstacle, distance from the obstacle to the PIR sensor, direction and speed of the obstacle (e.g., relative to the movable object), and gait of the obstacle (if applicable).

PIR sensors may be equal to about or smaller than approximately 5 mm$^2$, 10 mm$^2$, 20 mm$^2$, 30 mm$^2$, 40 mm$^2$, 50 mm$^2$, or 100 mm$^2$. PIR sensors may have a field of view. The field of view of the PIR sensor may refer to an extent of the environment that is detectable or sensible by the PIR sensor. The field of view may be described by the relative direction of the PIR sensor to the movable object. For example, the field of view may be oriented vertically, horizontally, upward, downward, side-ways, and the like relative to the movable object (e.g., a UAV). The field of view of the PIR sensor may be related to, or depend on the placement of the PIR sensor (e.g., on the UAV), a central axis of the PIR sensor, a detection range of the PIR sensor, and/or an angle of view of the PIR sensor. The PIR sensors may each have a central axis. The central axis of a PIR sensor, which may also be referred to as the "principal axis," can be a line along which there is some degree of rotational symmetry in the PIR sensor. The central axis of the PIR sensor may be directed upwards, downwards, to a lateral side, horizontally, vertically, or at any angle relative to the movable object. In some embodiments, the central axis of the PIR sensor passes through the center of the components (e.g., pyroelectric sensor) of the PIR sensor.

PIR sensors may have an angle of view. The angle of view of a PIR sensor may refer to the angular extent of a given environment that is detectable (e.g., sensible) by the PIR sensor. The PIR sensor may have an angle of view equal to about or less than 10°, 15°, 20°, 30°, 45°, 60°, 90°, 120°, 150°, 180°, 210°, 240°, 270°, 300°, 330°, or 360°. The PIR sensor may have a horizontal angle of view equal to about or less than 10°, 15°, 20°, 30°, 45°, 60°, 90°, 120°, 150°, 180°, 210°, 240°, 270°, 300°, 330°, or 360°. The PIR sensor may have a vertical angle of view equal to about or less than 10°, 15°, 20°, 30°, 45°, 60°, 90°, 120°, 150°, 180°, 210°, 240°, 270°, 300°, 330°, or 360°. Differing PIR sensors may have a same angle of view but a different field of view. PIR sensors may have a detection range in which it can detect obstacles. The detection range may be equal to about or less than 1 m, 2 m, 3 m, 4 m, 5 m, 10 m, 20 m, or 50 m.

PIR sensors may be enclosed by a housing or embedded within a housing. In some embodiments, PIR sensors may be external to a housing. PIR sensors may comprise optical elements to focus infrared energy onto the sensor surface. In some embodiments, the housing may comprise the optical elements. The optical elements may comprise lenses and/or mirrors. For example, the lens may be a Fresnel lens. PIR sensors may comprise filters to limit wavelengths of infrared light reaching the sensor surface. In some embodiments, the housing and/or the optical elements may comprise the filters. The filters on PIR sensors may limit the wavelength of infrared radiation impinging upon the sensor surface to about 2 um, 4 um, 6 um, 8 um, 10 um, 12 um, 14 um, 20 um, 22 um, 24 um, 26 um, 28 um, 30 um. In some embodiments, the filters on PIR sensors may limit the wavelength of infrared radiation impinging upon the sensor surface to a range. For example, using a filter, infrared radiation of about 0.2-8 um, 0.2-2 um, 2-4 um, 4-6 um, 6-8 um, 8-14 um, 8-12 um, 8-10 um, 10-12 um, 10-14, 14-16 um, 16-18 um, 18-20 um, or 14-20 um may impinge upon the sensor surface. In some instances, only infrared radiation (e.g., heat signal) of the wavelength or range of wavelengths impinging upon the PIR sensor surface may be detected. In some instances, only obstacles emitting or reflecting infrared radiation of the wavelength or range of wavelengths impinging upon the PIR sensor surface may be detected. For example, while a PIR sensor may be capable of detecting (e.g., receiving and generating energy or a pulse signal) infrared radiation 0.2-20 um in wavelength, a filter may limit the wavelength of the infrared radiation impinging upon the sensor surface (e.g., to 8-10 um). Using a filter, only infrared radiation of certain wavelengths may be passed to the PIR sensor surface while infrared radiation of other wavelengths are filtered off. Using a filter, specific obstacles may be detected or recognized. For example, using a filter that limits wavelength of infrared radiation able to impinge upon the PIR sensor surface to a range of about 8-10 um, a human may be detected or recognized. Using other filters that limit wavelength of infrared radiation able to impinge upon the PIR sensor, other obstacles or objects may be detected or recognized. For example, inanimate objects such as cars or buildings emitting infrared radiation of specific wavelength or a range of wavelengths may be detected or recognized.

In some instances, the PIR sensors may be located on board the movable object. The PIR sensors may be located on board the movable object in any number and in any configuration. PIR sensors may be located on a central body of the movable object or on a peripheral part of the movable object (e.g., on a carrier coupled to the movable object). PIR sensors of the present disclosure can be situated on any suitable portion of a movable object, such as above, underneath, on the side(s) of, or within a body of the movable object. The PIR sensors may be located on a center or off-center of the movable object. Some PIR sensors can be mechanically coupled to the movable object such that the spatial disposition and/or motion of the movable object correspond to the spatial disposition and/or motion of the PIR sensor. The PIR sensor can be coupled to the movable object via a rigid coupling, such that the PIR does not move relative to the portion of the movable object to which it is attached. The coupling can be a permanent coupling or non-permanent (e.g., releasable) coupling. Suitable coupling methods can include adhesives, bonding, welding, and/or fasteners (e.g., screws, nails, pins, etc.). Optionally, the PIR sensor can be integrally formed with a portion of the movable object. Furthermore, the PIR sensor can be electrically coupled with a portion of the movable object (e.g., processing unit, control system, data storage, flight controller) so as to enable the data collected by the PIR sensor to be used for various functions of the movable object (e.g., navigation, control, propulsion, collision avoidance maneuver, etc.), such as the embodiments discussed herein. The PIR sensor may be operably coupled with a portion of the movable object (e.g., processing unit, control system, data storage).

One, two, three, four, five, six, seven, eight, nine, ten or more PIR sensors may be located on board the movable object. In some instances, a collective field of view of the one or more PIR sensors on board the movable object may cover a 360° angle around the movable object. In some embodiments, the 360° angle may cover a panoramic view of the horizontal sides of the movable object. In some embodiments, a collective field of view of the one or more PIR sensors on board the movable object may cover a 360° vertical angle around the movable object. In some embodiments, the fields of view of the one or more PIR sensors may cover a 360 angle both horizontally and vertically around the movable object (e.g., covering an entire spherical region around the movable object). In some instances, a collective field of view of the one or more PIR sensors may not cover a 360° angle around the movable object. In some embodiments, a plurality of PIR sensors on board the movable object may have identical detection ranges (e.g., 5 m). In some embodiments, a plurality of PIR sensors on board the movable object may have differing detection ranges. In some embodiments, a plurality of PIR sensors on board the movable object may filter for different wavelengths (or ranges of wavelengths) of infrared radiation.

Figure 2:
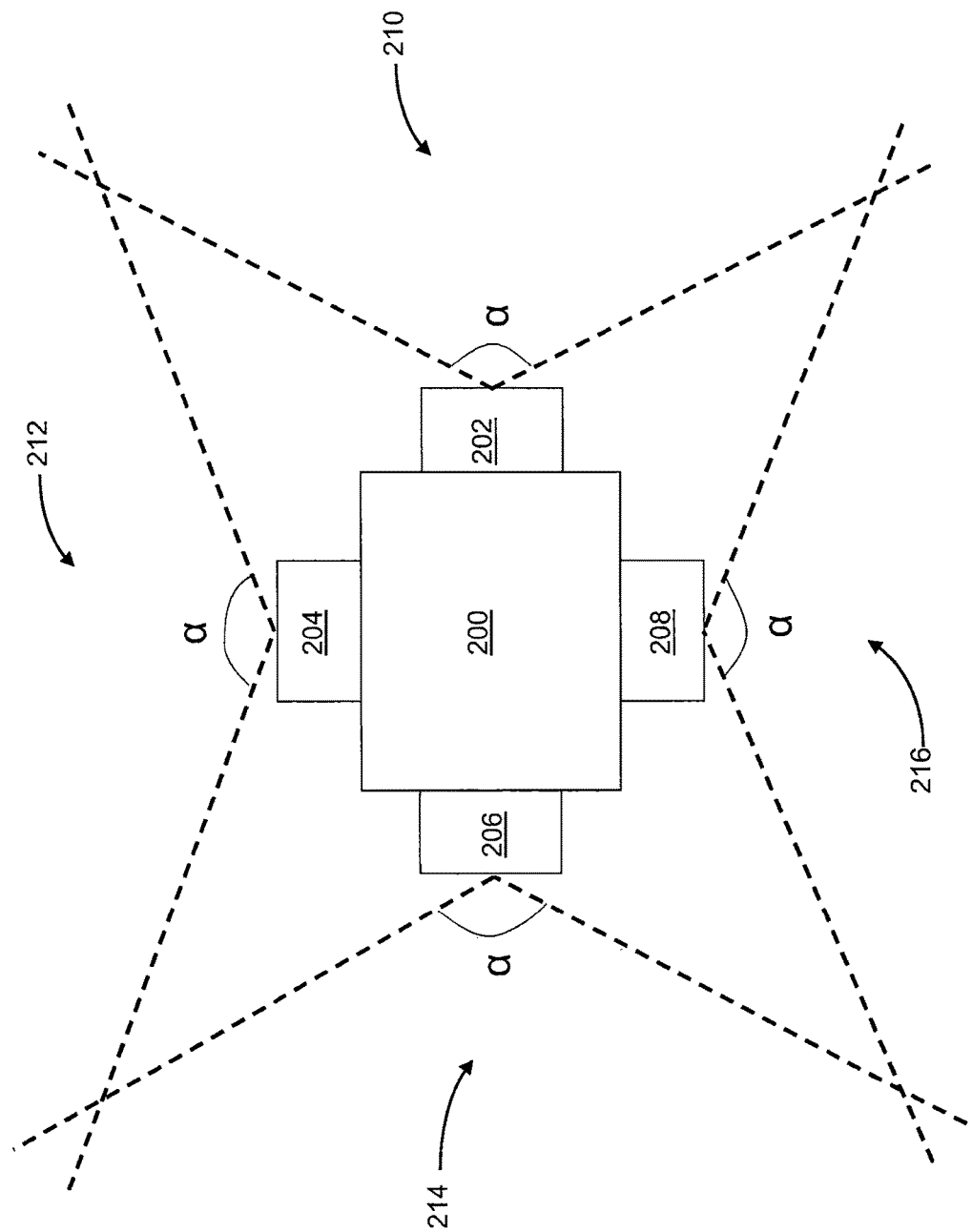
FIG. 2 illustrates a top down view of a device for human collision avoidance of UAV, in accordance with embodiments.

FIG. 2 illustrates a top down view of a device for human collision avoidance of UAV, in accordance with embodiments. The UAV 200 has four PIR sensors 202, 204, 206, 208 on board the UAV, each with an angle of view of a. PIR sensors 202, 204, 206, 208 are located on a lateral side of the UAV. Collectively, PIR sensors 202, 204, 206, 208 have a field of view that covers a 360° angle around the movable object as shown by the overlapping fields of view 210, 212, 214, 216. In some instances, different PIR sensors may filter for, receive and detect infrared radiation of same, or similar wavelengths. For example, PIR sensors 202, 204, 206, 208 may all filter for, receive and detect infrared radiation 10 um (or in a range of 8-12 um) in wavelength. In some instances, different PIR sensors may filter for, receive and detect infrared radiation of different wavelengths. For example, PIR sensors 202, 204 may filter for, receive and detect infrared radiation 10 um (or in a range of 8-12 um) in wavelength while PIR sensors 206, 208 may filter for, receive and detect infrared radiation of other wavelengths. In some instances, different PIR sensors may have the same detection range. For example, PIR sensors 202, 204, 206, 208 may all have an identical detection range (e.g., 5 m). In some instances, different PIR sensors may have different detection ranges. For example, PIR sensors 202, 204 may have a detection range or 10 m while PIR sensors 206, 208 may have a detection range of 5 m.

In step 104, the obstacle may be recognized based on the heat signal that is received in step 102. Obstacles (e.g., objects and/or subjects) may radiate a heat signal (e.g., infrared radiation) that is specific to the obstacle. For example, human beings may emit infrared radiation that is about 8 um, 10 um, 12 um, or in a range of about 8-12 um in wavelength. For example, mammals may emit infrared radiation that is about 8 um, 10 um, 12 um, or in a range of about 8-12 um in wavelength. In some instances, obstacles that have a temperature of around 37° Celsius may emit infrared radiation that is about 8 um, 10 um, 12 um, or in a range of about 8-12 um in wavelength. In some instances, obstacles such as buildings or vehicles may emit infrared radiation of specific wavelengths. In some embodiments, the wavelength of infrared radiation emitted by an obstacle may depend or relate to a temperature, size, volume, shape, and/or surface characteristic of the obstacle. In some instances, the PIR sensors may be configured to receive specific wavelengths or range of wavelengths of infrared radiation as previously stated herein (e.g., using filters). The specific wavelengths or range of wavelengths of infrared radiation received or detected may correspond to infrared radiation emitted from specific obstacles (e.g., one type of obstacle such as a human being). Thus, the obstacle may be recognized based on the infrared radiation (e.g., heat signal) received in step 102.

In some instances, the PIR sensors may be configured to receive or detect a range of wavelength of infrared radiation that does not correspond to infrared radiation emitted from a specific obstacle (e.g., one type of obstacle such as a human being). In response to receiving heat signals from the obstacle, the PIR sensors may output signals wherein characteristics (e.g., magnitude) of the output signals varies depending on the type of obstacle heat signals are received from. For example, a large output signal by the PIR sensor may correspond to a human being. For example, a large output by the PIR sensor may correspond to a mammal. For example, a large output by the PIR sensor may correspond to a large mammal (e.g., mammal comparable in size to a human or larger). A predetermined list of obstacle types may be stored, e.g., on a local memory on board the PIR sensor and/or the movable object or off board the movable object but in communication with the PIR sensors. Each of the obstacle type may be correlated to an output signal with a certain characteristic (e.g., of a certain magnitude) and the obstacle type may be recognized based on the output signal by the PIR sensor. A heat signal from an obstacle may be received by a PIR sensor, the PIR sensor may generate an output signal (e.g., detect the obstacle), the output signal by the PIR sensor may be measured (e.g., with a microcontroller), and the obstacle may be recognized based on the infrared radiation (e.g., heat signal) received in step 102.

For example, if the PIR sensor receives an infrared radiation (e.g., heat signal) of 8 um, 10 um, 12 um, or 8-12 um in wavelength, an obstacle may be detected and recognized as belonging to a human being. In some embodiments, different PIR sensors on board the movable object may be configured to detect different obstacles and/or recognize or distinguish between obstacles. PIR sensors may be configured to distinguish a human from other obstacles. PIR sensors may be configured to distinguish mammals from other obstacles. PIR sensors may be configured to distinguish animals from other obstacles. PIR sensors may be configured to distinguish between different types of animals (e.g., cold blooded vs. warm blooded). PIR sensors may be configured to distinguish between different types of mammals (e.g., big vs. small). For example, one or more PIR sensors may be configured to receive or detect infrared radiation of 8 um, 10 um, 12 um, or in the range of 8-12 um in wavelength while one or more other PIR sensors may be configured to receive or detect infrared radiation of other wavelengths. If PIR sensors configured to receive IR radiation 8 um, 10 um, 12 um (or 8-12 um) in wavelength respond (e.g., generate energy, output a pulse signal, etc), obstacles detected may be recognized as humans. If PIR sensors configured to receive IR radiation 8 um, 10 um, 12 um (or 8-12 um) in wavelength do not respond but other PIR sensors do respond, obstacles detected may be recognized as non-humans. Step 104 of recognizing the obstacle may include differentiating the obstacle from different types of obstacles based on the infrared radiation (e.g., heat signal) as described herein (e.g., differentiating between human and non-human).

In some embodiments, step 104 may be optional and the obstacle may not need to be recognized for subsequent steps. For example, step 106 of calculating a distance from the movable object to the obstacle or step 108 of determining an appropriate flight response measure may be implemented as soon as an infrared radiation (e.g., of specific wavelength of range of wavelengths) is received or detected.

In step 106, a distance from the movable object to the obstacle may be calculated with aid of one or more processors. A processor may comprise a field-programmable gate array (FPGA), application-specific integrated circuit (ASIC), application-specific standard product (ASSP), digital signal processor (DSP), central processing unit (CPU), graphics processing unit (GPU), vision processing unit (VPU), complex programmable logic devices (CPLD), and the like. A processor may be an on-board processor on-board a movable object (e.g., a UAV) or an embedded processor carried by the PIR sensor. A processor may be an off-board processor separated from the movable object and/or the PIR sensor (e.g., at a ground station, communicating with a UAV and/or PIR sensor). The one or more processors as referred to herein may be individually or collectively configured to further aid in method 100 as recited herein. In some instances, a single processor (or CPU) may be configured to aid in method 100 for a plurality of PIR sensors. In some instances, a plurality of processors may be configured to aid in method 100 for a single PIR sensor.

The calculated distance may be based on, or depend on data from the PIR sensor. In some instances, the distance from the movable object to the obstacle may be calculated or determined to be the detection range of the PIR sensor that detects the obstacle. For example, at the moment a PIR sensor first detects an obstacle, the instantaneous distance from the movable object to the obstacle may be determined to be the detection range of the PIR sensor. For example, for a PIR sensor having an field of view of 360° (or PIR sensors of the same detection range collectively having a field of view of 360°), the distance from the movable object to the obstacle at the moment an object is first detected (or recognized) may be substantially equal to the detection range of the PIR sensor. In some embodiments, the distance from the movable object to the obstacle at the moment an object is detected (or recognized) may be calculated or determined (e.g., estimated) to be equal to the detection range of the PIR sensor that detects the obstacle even if the field of view (or collective fields of view of a plurality of PIR sensors) does not equal 360°.

In some instances, the distance from the movable object to the obstacle may be calculated or determined based on an output signal of the PIR sensor. As previously stated herein, the output signal (e.g., pulse signal, voltage signal) by the pyroelectric materials may depend on factors such as a distance from an obstacle to the PIR sensor. For example, the strength of the output signal of the PIR sensor may increase as a distance from the movable object to the obstacle decreases. In some instances, a relationship between the distance and peak value of PIR sensor output signal may be calibrated (e.g., in advance) and a distance corresponding to a peak value of PIR sensor output signals may be known. In some instances, one or more processors (e.g., microcontroller) may detect a peak value of an output signal of the PIR sensor and calculate or determine a distance based on a calibration curve. Accordingly, a distance from the movable object to the obstacle at time points subsequent to first detection of the obstacle may be determined. In some instances, other factors (e.g., speed and direction of the obstacle relative to the movable object) may be calculated or determined based on an output signal of the PIR sensor under similar reasoning (e.g., according to output signals of the PIR sensors).

Figure 3:
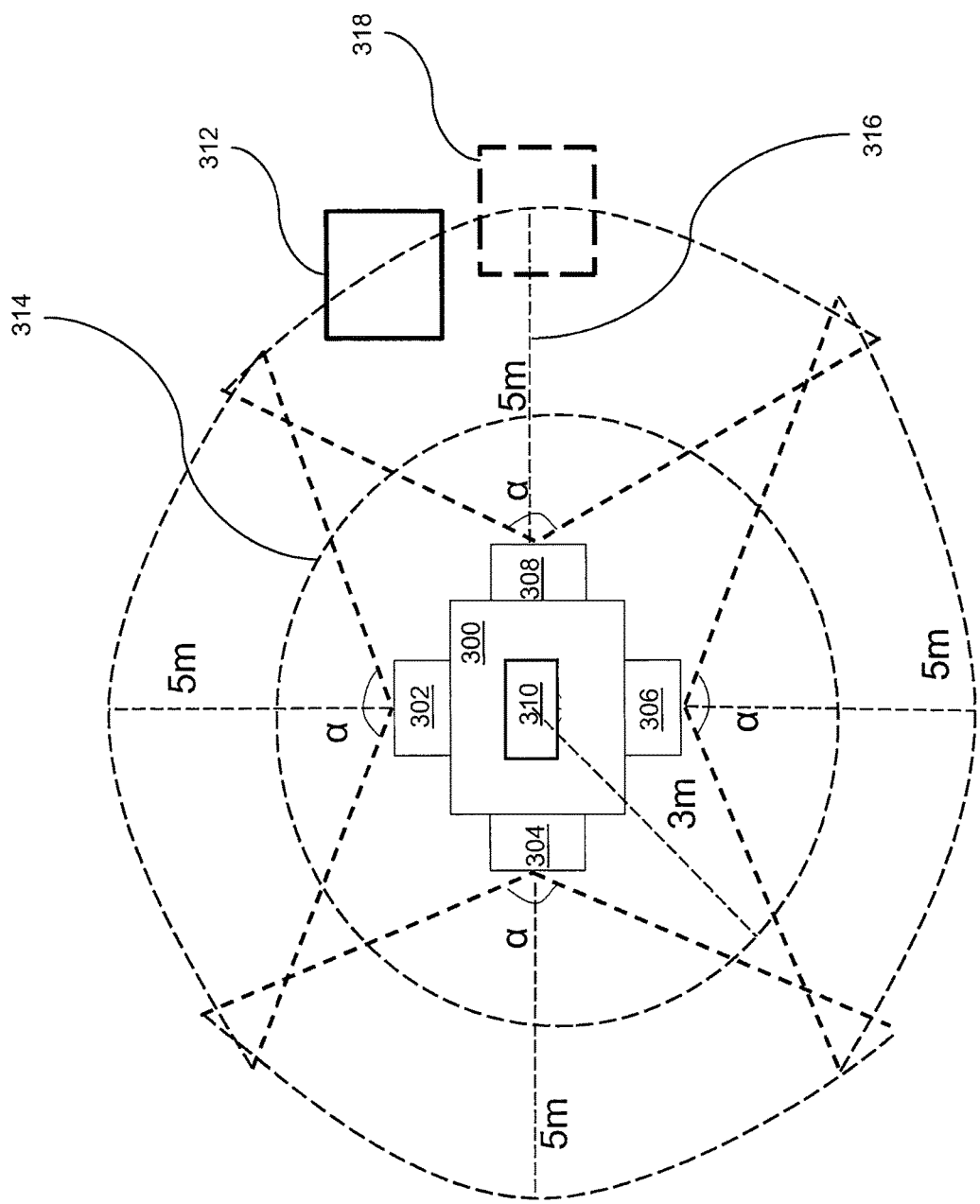
FIG. 3 illustrates a UAV with a plurality of PIR sensors detecting an obstacle, in accordance with embodiments.

FIG. 3 illustrates a UAV 300 with a plurality of PIR sensors 302, 304, 306, 308, and 310 detecting an obstacle 312, in accordance with embodiments. PIR sensors 302, 304, 306, 308 are located on a lateral side of the UAV while PIR sensor 310 is located on an upper surface (e.g., sky-facing surface) of the UAV. PIR sensor 310 has a horizontal angle of view of 360 degrees and a range of 3 m defined by 314. PIR sensors 302, 304, 306, 308 each has a horizontal angle of view of α degrees and a detection range of 5 m. PIR sensors 302, 304, 306, 308 collectively have a field of view that covers a 360° angle around the movable object 300 as shown by the overlapping fields of view. In some instances, PIR sensors of a certain detection range may collectively not have a field of view that covers a 360° angle around the movable object, and there may be blind spots in which the PIR sensors cannot detect obstacles at a certain distance. PIR sensor 310 may be used to detect obstacles roughly at a distance of 3 m or less to the movable object. PIR sensors 302, 304, 306, 308 may be used to detect obstacles roughly at a distance of 5 m or less to the movable object. PIR sensors 302, 304, 306, 308, 310 may all filter for and receive infrared radiation of certain wavelengths. For example, the PIR sensors may receive IR radiation approximately 10 um (or in a range of 8-12 um) in wavelength and generate energy or an output signal. When an obstacle is first detected by PIR sensor 302, 304, 306, or 308, the distance from the movable object to the obstacle may be calculated or determined to be 5 m. When an obstacle is first detected by PIR sensor 310, the distance from the movable object to the obstacle may be calculated or determined to be 3 m. The distance from the movable object 300 to obstacle 312 may be calculated by detecting a peak value of output signal of the PIR sensor (e.g., using a microcontroller) and comparing the peak value to a calibration curve (e.g., calibration curve showing the relationship between the distance and peak value of PIR sensor output signal). For example, using a calibration curve, the distance may be calculated or determined to be anywhere in a range of 0 m to 5 m. The distance may be calculated to an accuracy of about or within 0.1 m, 0.2 m, 0.3 m, 0.4 m, 0.5 m, 1 m, or 2 m of the actual distance.

In some embodiments, a relative position of the movable object to the obstacle may be determined, e.g., based on a direction of mounting of the PIR sensor (e.g., field of view, direction of a central axis of the PIR sensor) and a distance to the obstacle. One or more processors may determine which PIR sensor is generating an output signal and central axis of each of the PIR sensors, or a direction which the PIR sensors are mounted may be predetermined or stored in a memory operably coupled to one or more processors. A distance from the obstacle to the movable object may be calculated or determined as previously described herein. For example, FIG. 3 shows obstacle 312 within a field of view of PIR sensor 308. PIR sensor 308 may generate an output signal because the obstacle 312 is in its field of view while PIR sensors 302, 304, 306, 310 may generate no output signal. A distance from the obstacle 312 to movable object 300 may be calculated to be 5 m. A mounting direction or a direction of the central axis 316 of PIR sensor may be stored in a memory unit. Based on the distance and the central axis, a position of the obstacle relative to the movable object may be estimated to be at location 318. Using additional PIR sensors and/or PIR sensors with a smaller angle of view, a more accurate and precise determination of the position of obstacles may be made.

In some embodiments, step 106 may be optional and a distance from the movable object to the obstacle may not need to be determined or calculated for subsequent steps. For example, step 108 of determining an appropriate flight response measure may be implemented as soon as an obstacle is detected and/or recognized.

In step 108, whether to effect (e.g., implement, perform) a flight response measure may be determined. In some embodiments, the flight response measure may be a collision avoidance maneuver. Determining whether to effect a flight response measure may comprise determining an appropriate flight response measure (e.g., collision avoidance maneuver). The appropriate flight response measure and/or whether to effect a flight response measure (e.g., collision avoidance maneuver) may be determined and adopted with aid of a flight controller. The determination may be made on-board the movable object (e.g., using one or more processors on board the movable object). The determination may be made off-board the movable (e.g., using one or more processors operably coupled to the movable object). The determination may be made automatically (e.g., with aid of the one or more processors, with aid of the flight controller). The determination may be made manually or semi-automatically (e.g., with some user input). The determination may be based on one or more factors such as a distance from the movable object to the obstacle (e.g., calculated in step 106), direction of movement of the movable object, speed of the movable object, direction of movement of the obstacle, speed of the obstacle, relative position of the obstacle to the movable object, obstacle type (e.g., recognized in step 104), capabilities of the movable object (e.g., acceleration or deceleration capabilities), size and type of the movable object, size and type of the obstacle, and/or an altitude of the movable object. In some instances, the factors (e.g., distance from the movable object to the obstacle) may be of data acquired using PIR sensors as mentioned herein. In some instances, the factors may be of data acquired using other sensors (e.g., IMU sensors measuring a speed of the movable object).

In some embodiments, the flight response measure (e.g., collision avoidance maneuver) may comprise decreasing or limiting a speed of the movable object. In some embodiments, the flight response measure (e.g., collision avoidance maneuver) may comprise stopping one or more propulsion units of the movable object. In some embodiments, the flight response measure (e.g., collision avoidance maneuver) may comprise braking or stopping movement of the movable object. In some embodiments, the flight response measure (e.g., collision avoidance maneuver) may comprise altering a direction of the moving course of the movable object. In some embodiments, the flight response measure (e.g., collision avoidance maneuver) may comprise increasing or decreasing an altitude of the movable object. In some embodiments, the flight response measure may comprise sending an alert (e.g., auditory, visual, tactile warning signal) to an operator of the movable object. In some embodiments, the flight response measure may comprise sending an alert (e.g., auditory, visual, tactile warning signal) to the detected obstacle or target. In some embodiments, the flight response measure may comprise triggering one or more imaging devices to capture images (e.g., of the obstacle and/or environment around the movable object). In some embodiments, the flight response measure may comprise tracking a target (e.g., the obstacle). In some embodiments, tracking a target may comprise following the target and/or capturing one or more images of the target. The target may be followed at a specified distance. In some embodiments, the flight response measure (e.g., collision avoidance maneuver) may comprise deploying one or more airbags on board the movable object and/or deploying one or more parachutes on board the movable object.

In some instances, one or more flight response measures may be performed, effected or implemented depending on the aforementioned factors such as the distance. For example, different flight response measures may be effected depending on one or more threshold distances. For example, there may be one threshold distance (e.g., 5 m). A distance from the movable object to the obstacle or the target may be determined, and compared to the threshold distance. If an obstacle is detected to be within the threshold distance, a flight response measure may be effected (e.g., braking). Outside of the threshold distance, a second flight response measure may be effected (e.g., sending a warning signal) or no flight response measure may be effected. In some instances, the one or more flight response measures to be effected may depend on a plurality of factors (two or more factors) such as a distance and a speed of the movable object (e.g., movable object) relative to the obstacle.

For example, there may be two threshold distances (e.g., 2 m and 5 m). A distance from the movable object to the obstacle or the target may be determined, and compared to the threshold distances. If an obstacle is detected to be within the first threshold distance (e.g., 2 m), a first flight response measure may be implemented, such as braking or stopping one or more propulsion units of the movable object. If an obstacle is detected to be outside the first threshold distance (e.g., 2 m) but within the second threshold distance (e.g., 5 m), a second flight response measure may be implemented, such as altering a direction of movement of the movable object or decreasing a velocity of the movable object. Outside of the second threshold distance, a third flight response measure may be effected (e.g., sending a warning signal) or no flight response measure may be effected. In some instances, the one or more flight response measures to be effected may depend on a plurality of factors (two or more factors) such as a distance and a speed of the movable object (e.g., movable object) relative to the obstacle.

Method 100 may further comprise effecting the appropriate flight response strategy (e.g., collision avoidance maneuver) when a determination is made in step 108.

Figure 4:
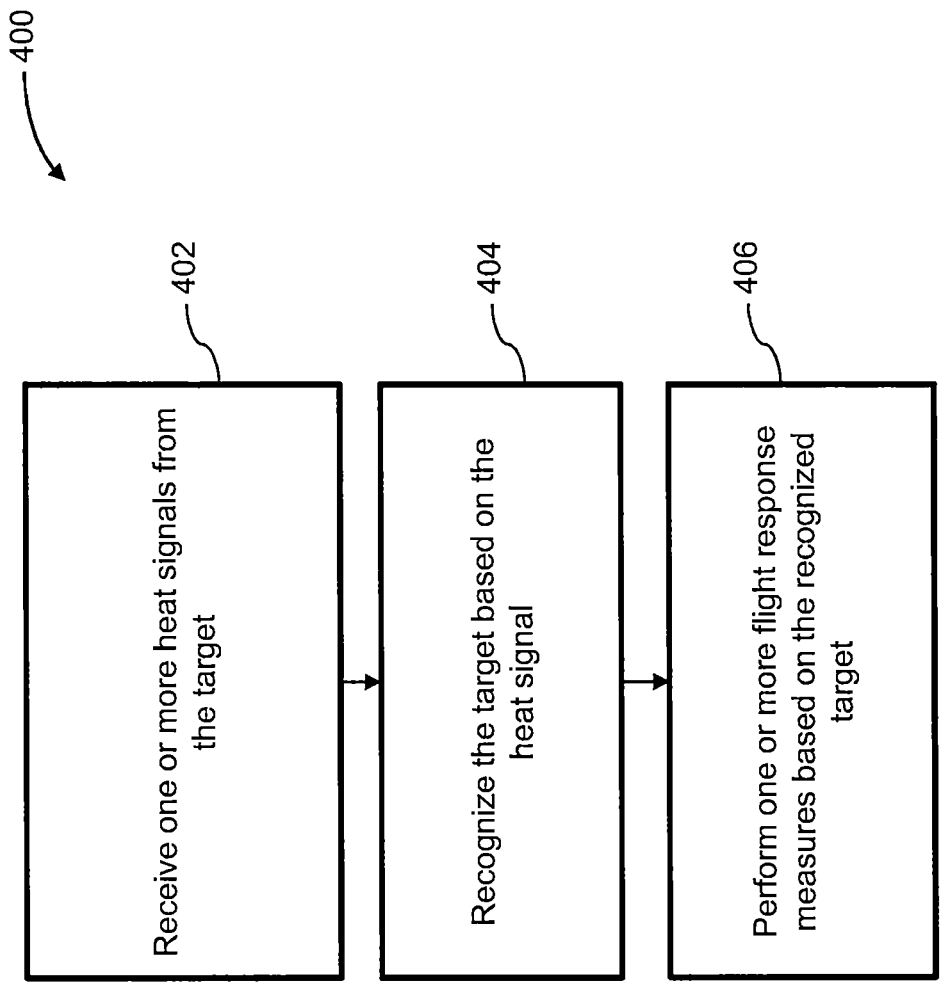
FIG. 4 illustrates a method for responding to a target, in accordance with embodiments.

FIG. 4 illustrates a method 400 for responding to a target, in accordance with embodiments. In step 402, one or more heat signals from a target may be received (e.g., by PIR sensors). The heat signals may be for example, infrared radiation ranging in wavelength from 0.2 to 20 um, as described herein. The target may comprise the obstacles as referred herein, including objects and subjects such as human beings, cars, buildings, animals, etc. In step 404 the target may be detected or recognized, previously as described herein. For example, the PIR sensor may generate energy or a pulse signal in response to the received infrared radiation (e.g., 0.2-20 um in wavelength) and accordingly detect the obstacle. For example, the PIR sensors may comprise filters that selectively allow infrared radiation of certain wavelengths (e.g., 8-10 um) to reach the PIR sensor surface. The PIR sensor may generate energy or a pulse signal in response to the received infrared radiation and detect the obstacle. The detected obstacle may be recognized as a type of obstacle (e.g., human) due to the filter limiting the range of wavelengths impinging upon the PIR sensor surface. The detected obstacle may be recognized as a type of obstacle via other methods as previously describe herein (e.g., based on an output signal of the PIR sensor). In step 406 one or more flight response measures may be performed based on the detected or recognized target. The flight response measures may be as previously described herein (e.g., tracking a target, sending an alert or a warning signal, altering a flight path, etc).

In some embodiments, the flight response measure may comprise tracking a target. Tracking the target may comprise following or trailing the target and/or capturing images of the target using one or more imaging devices. In some instances, the target may be followed or trailed at a desired distance. The desired distance may be predetermined and/or may be updated with user input in real time (e.g., while the target is being tracked). In some instances, the flight response measure may comprise maintaining a desired distance (e.g., a trailing distance) from the target (e.g., obstacle). For example, a target may be detected and a distance may be calculated, as previously described herein. A desired trailing distance (e.g., threshold distance) may be determined (e.g., 5 m, predetermined) and a peak output signal of the PIR sensors may be measured and monitored. A PIR sensor peak output signal corresponding to the trailing distance may be determined according to a calibration curve. If the peak output signal of the PIR sensor is greater than a peak output signal corresponding to the trailing distance, the movable object may move away from the obstacle (e.g., based on the relative position and/or direction of the movable object from the obstacle). If the peak output signal of the PIR sensor is less than a peak output signal corresponding to the trailing distance, the movable object may move towards the obstacle (e.g., based on the relative position and/or direction of the movable object from the obstacle). Accordingly, a "follow" function may be achieved wherein the movable object follows or trails a target (e.g., an obstacle, a human being) while maintaining a desired trailing distance.

The desired trailing distance may be updated, e.g., using user input. For example, the user may specify the movable object to follow the target at a distance of about 1 m, 2 m, 3 m, 4 m, 5 m, 6 m, 7 m, 8 m, 9 m, 10 m, or more. The target may be tracked or followed at a specified position relative to the target (e.g., at a specified altitude relative to the target, at a specified vertical distance relative to the target, at a specified horizontal distance relative to the target). For example, the movable object may track (e.g., follow) the target at a horizontal plane directly above the target while maintaining the desired distance. For example, the movable object may track the target at on the same horizontal plane as the target while maintaining the desired distance. For example, the movable object may track the target while maintaining an equidistant horizontal and vertical distance from the target. In some embodiments, a desired position of the movable object relative to the target may be updated (e.g., in real time). For example, a movable object may be configured to track the target at a distance of about 5 m equidistant horizontally and vertically from the target. A user may subsequently specify the movable object to track the target directly above the target while maintaining the trailing distance. In some embodiments, the movable object may track the target while sending an alert (e.g., visual, auditory, or tactile warning signal) to the detected target, obstacle, and/or operator of the movable object. In some embodiments, one or more images of the target may be captured. The movable object may track the target while capturing images of the target or obstacle. In some embodiments, the movable object may capture images of the target while following (e.g., trailing) the target.

FIG. 5 illustrates a movable object tracking a target, in accordance with embodiments. The movable object may receive a heat signal (e.g., infrared radiation) from the human being (e.g., the target) and track the target (e.g., capture images of the target or follow the target). A human being is shown moving from position 503 to position 507 over a time period. A movable object receives a heat signal from the target. The movable object may detect the target, recognize the target based on the received heat signal (e.g., infrared radiation), and determine a distance 504 from the movable object to the target. The movable object may follow or trail the target from position 502 to position 506 as the target moves from position 503 to position 505. The distance from the movable object to the target 504 at the earlier time point and the distance from the movable object to the target 508 at the later time point may be identical. The movable object may maintain the distance and/or a relative position to the target while it tracks the target (e.g., follows the target and/or captures images of the target). The movable object may vary or change the distance and/or relative position to the target while it tracks the target (e.g., with external input).

Figure 6:
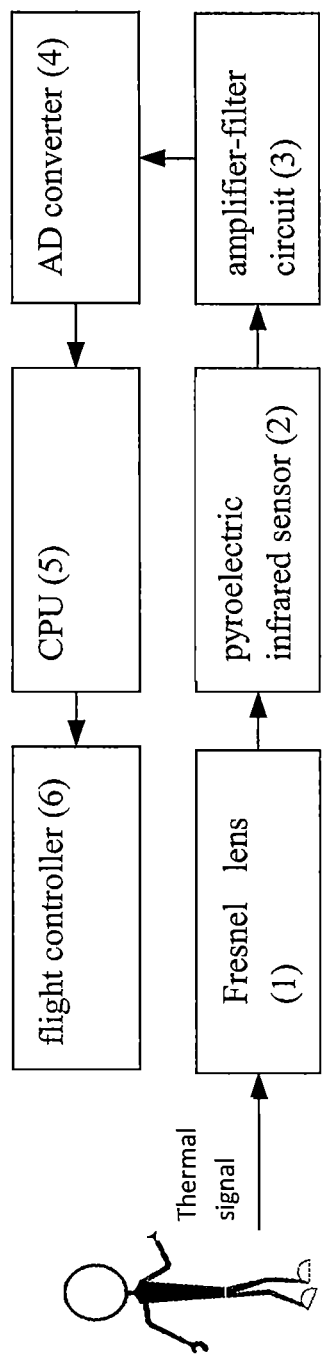
FIG. 6 provides a block diagram of a device for human collision avoidance of UAV, in accordance with embodiments.

FIG. 6 illustrates a block diagram for human collision avoidance of UAVs, in accordance with embodiments. A human may emit a thermal signal (e.g., infrared radiation). The thermal signal may be emitted at a wavelength as previously described herein (e.g., 10 um, 8-12 um, etc). The thermal signal may be focused onto a sensor surface, for example, using optical elements such as a Fresnel lens. In some embodiments, the optical elements may amplify the infrared radiation emitted from the human and focus the IR radiation on a PIR (e.g., pyroelectric IR) sensor surface. The PIR sensor may receive the thermal signal after the thermal signal has passed through an optical element such as the Fresnel lens. The pyroelectric IR sensor may receive the IR radiation and in response, output energy, or a low frequency pulse signal. The pulse signal may be processed by an amplifier-filter circuit and then be transferred to a digital signal by an analog-to-digital (AD) converter. In some embodiments, the AD converter may be a comparator. The digital signal may be output to one or more processors such as a computer processing unit (CPU) which may determine whether an obstacle is around, whether the obstacle is a human, and a distance of the obstacle from the movable object. This information may be informed to a flight controller which may adopt appropriate flight response strategies in order to implement human collision avoidance. In some embodiments, the flight controller may comprise the one or more processors (e.g., CPU). For example, if an obstacle is detected and recognized as a human, a distance may be calculated. In some embodiments, if the distance is calculated to be 10 m or more, the collision avoidance maneuver may be to increase the altitude of the movable object, to decelerate the movable object, or to alter a direction of the moving course of the UAV. In some embodiments, if the distance is calculated to be 5 m or less, the collision avoidance maneuver may be to decelerate (e.g., brake) or to stop the one or more propulsion units of the movable object.

Figure 7:
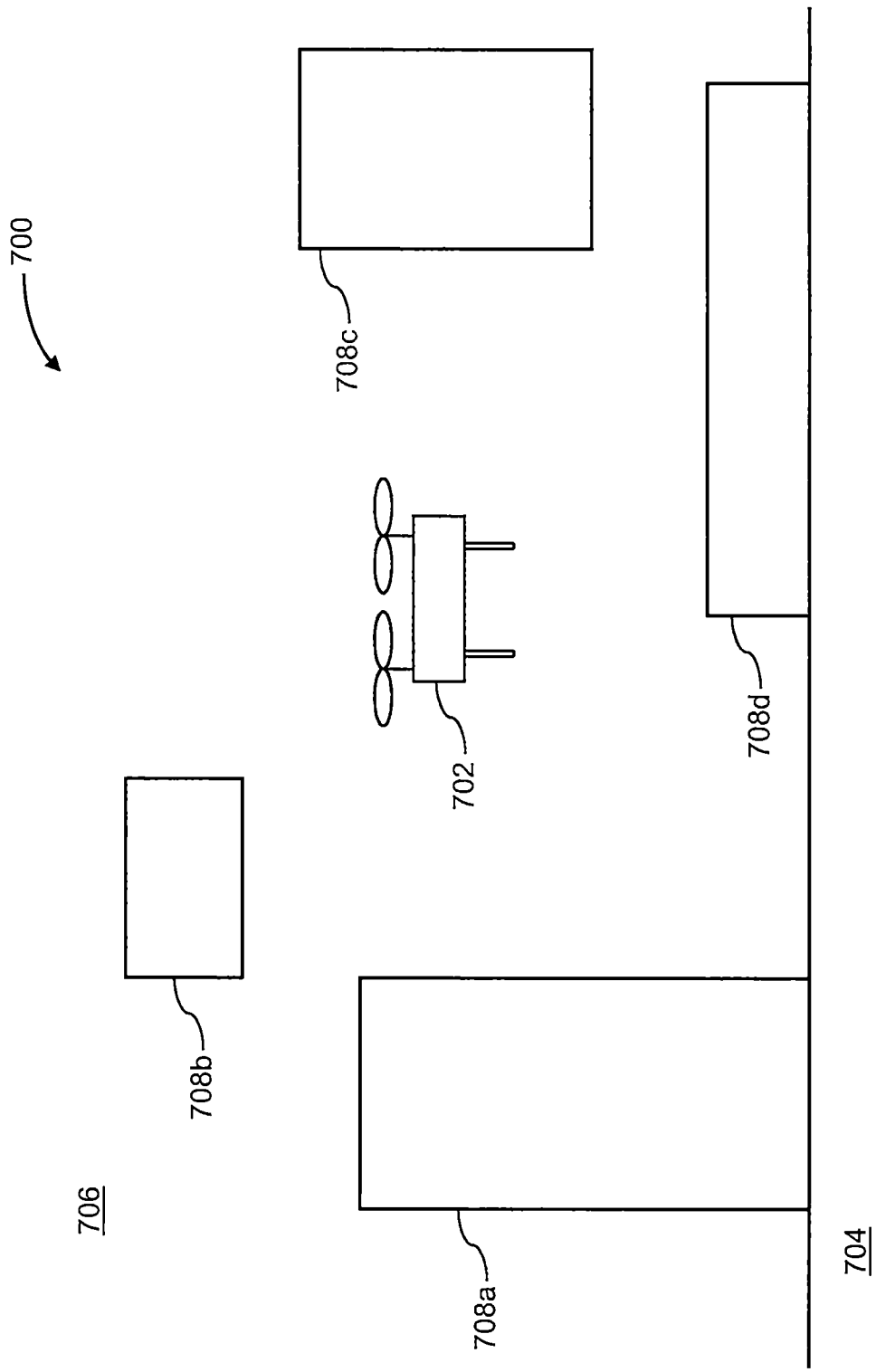
FIG. 7 illustrates a UAV operating in an outdoor environment, in accordance with embodiments.

The apparatus, methods, and computer readable mediums disclosed herein may offer improved operational capabilities (e.g., collision avoidance maneuver) for movable objects. FIG. 7 illustrates a UAV 702 operating in an outdoor environment 700, in accordance with embodiments. The outdoor environment 700 may be an urban, suburban, or rural setting, or any other environment that is not at least partially within a building. The UAV 702 may be operated relatively close to the ground 704 (e.g., low altitude) or relatively far from the ground 704 (e.g., high altitude). For example, a UAV 702 operating less than or equal to approximately 10 m from the ground may be considered to be at low altitude, while a UAV 702 operating at greater than or equal to approximately 10 m from the ground may be considered to be at high altitude.

In some embodiments, the outdoor environment 700 includes one or more objects 708a-d. Some objects may be situated on the ground 704 (e.g., objects 708a, 708d), such as buildings, ground vehicles (e.g., cars, motorcycles, trucks, bicycles), human beings, animals, plants (e.g., trees, bushes), and other manmade or natural structures. Some objects may be in contact with and/or supported by the ground 704, water, manmade structures, or natural structures. Alternatively, some objects may be wholly located in the air 706 (e.g., objects 708b, 708c) and may be mobile (e.g., aerial vehicles, airplanes, helicopters, hot air balloons, UAVs, or birds). Aerial objects may not be supported by the ground 704, or by water, or by any natural or manmade structures. An obstacle located on the ground 704 may include portions that extend substantially into the air 706 (e.g., tall structures such as towers, skyscrapers, lamp posts, radio towers, power lines, trees, etc.).

In some instances, sensors such as Lidar sensors may be utilized for obstacle avoidance in an outdoor environment 700. For example, a 3D Lidar module may be provided on a UAV. A laser beam may be emitted and a 3-dimensional coordinate of a scanned spot may be obtained using a camera. A distance from the UAV to a nearby obstacle may be further determined and obstacle avoidance may be achieved. In some embodiments, lighting conditions may deteriorate performance of the Lidar sensors in achieving obstacle avoidance. For example, 3D Lidar may be interfered by sunlight. PIR sensors may be utilized as an alternative or supplement to the other sensors or methods (e.g., Lidar sensors) for obstacle avoidance in an outdoor environment. For example, PIR sensors may be utilized in areas in which Lidar sensors do not work. PIR sensors may be able to detect and avoid obstacles regardless of lighting conditions in an environment (e.g., outdoor environment).

In some instances, one or more PIR sensors coupled to the UAV 702 may detect obstacles in an outdoor environment 700. In some instances, the PIR sensors may be configured to selectively detect and recognize obstacles, such as human obstacles. For example, the PIR sensors may be able to differentiate certain obstacles from different types of obstacles based on a heat signal (e.g., infrared radiation) emitted by the obstacles. PIR sensors or one or more processors coupled to the PIR sensor may further calculate or determine a distance from the UAV to the obstacle based on data from the PIR sensor and determine whether to effect a collision avoidance maneuver as previously described herein.

Figure 8:
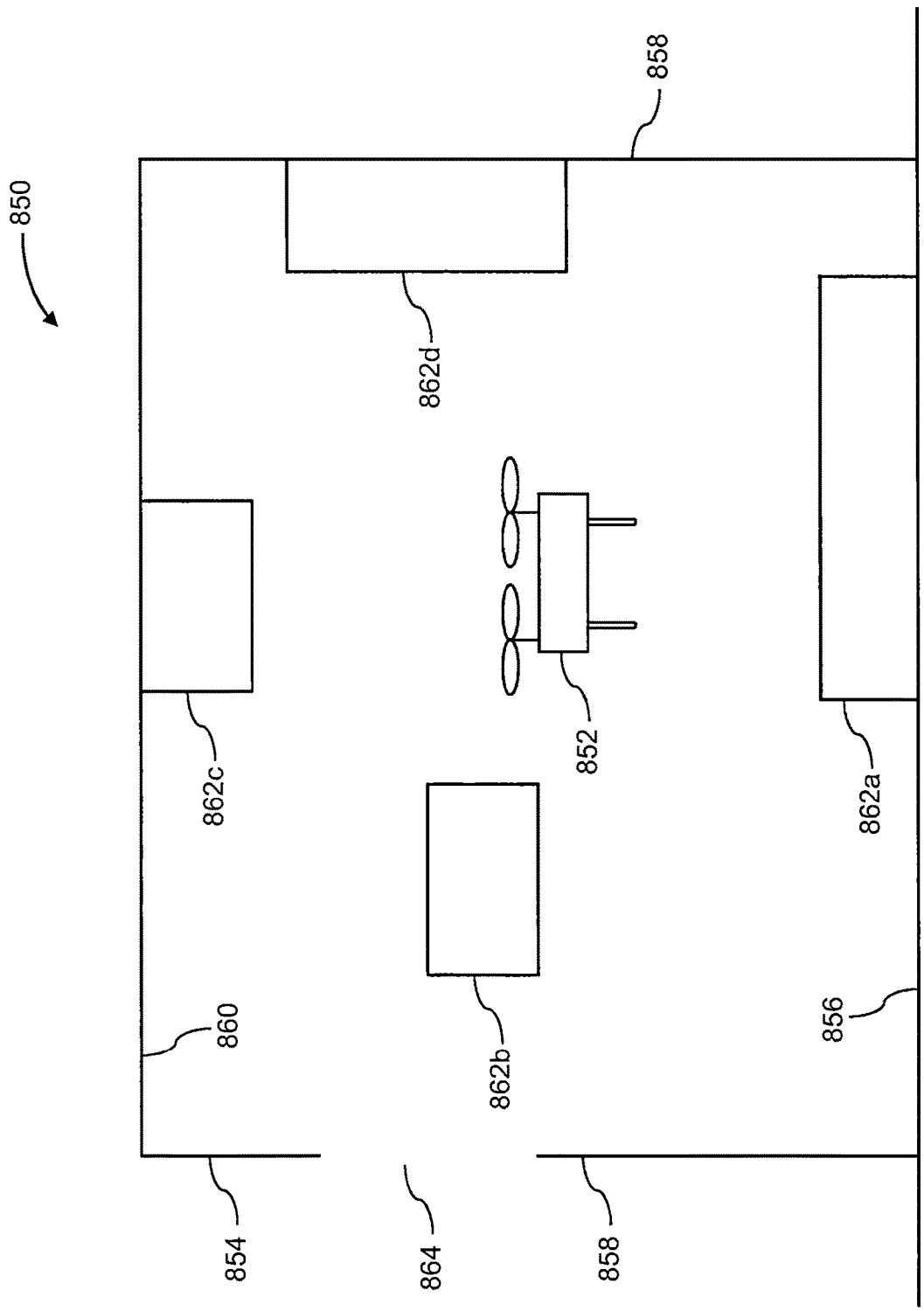
FIG. 8 illustrates a UAV operating in an indoor environment, in accordance with embodiments.

FIG. 8 illustrates a UAV 852 operating in an indoor environment 850, in accordance with embodiments. The indoor environment 850 is within the interior of a building 854 having a floor 856, one or more walls 858, and/or a ceiling or roof 860. Exemplary buildings include residential, commercial, or industrial buildings such as houses, apartments, offices, manufacturing facilities, storage facilities, and so on. The interior of the building 854 may be completely enclosed by the floor 856, walls 858, and ceiling 860 such that the UAV 852 is constrained to the interior space. Conversely, at least one of the floor 856, walls 858, or ceiling 860 may be absent, thereby enabling the UAV 852 to fly from inside to outside, or vice-versa. Alternatively or in combination, one or more apertures 864 may be formed in the floor 856, walls 858, or ceiling 860 (e.g., a door, window, skylight).

Similar to the outdoor environment 700, the indoor environment 850 can include one or more objects 862a-d. Some objects may be situated on the floor 856 (e.g., obstacle 862a), such as furniture, appliances, human beings, animals, plants, and other manmade or natural objects. Conversely, some objects may be located in the air (e.g., object 862b), such as birds or other UAVs. Some obstacles in the indoor environment 850 can be supported by other structures or objects. Objects may also be attached to the ceiling 860 (e.g., obstacle 862c), such as light fixtures, ceiling fans, beams, or other ceiling-mounted appliances or structures. In some embodiments, objects may be attached to the walls 858 (e.g., obstacle 862d), such as light fixtures, shelves, cabinets, and other wall-mounted appliances or structures. Notably, the structural components of the building 854 can also be considered to be objects, including the floor 856, walls 858, and ceiling 860.

The objects described herein may be substantially stationary (e.g., buildings, plants, structures) or substantially mobile (e.g., human beings, animals, vehicles, or other objects capable of movement). Some objects may include a combination of stationary and mobile components (e.g., a windmill). Mobile objects or obstacle components may move according to a predetermined or predictable path or pattern. For example, the movement of a car may be relatively predictable (e.g., according to the shape of the road). Alternatively, some mobile objects or object components may move along random or otherwise unpredictable trajectories. For example, a living being such as an animal may move in a relatively unpredictable manner.

In some instances, sensors such as vision sensors may be utilized for obstacle avoidance within an indoor environment 850. For example, a stereo vision module may be provided on a UAV. Images may be captured from two cameras, and depth information may be acquired via visual image processing methods. Subsequently, a distance from the UAV to a nearby obstacle may be determined and obstacle avoidance may be achieved. In some embodiments, lighting conditions may deteriorate performance of the vision sensors in achieving obstacle avoidance. For example, stereo vision may not work without visible light and may be disabled in dim or dark lighting conditions. PIR sensors may be utilized as an alternative or supplement to the other sensors or methods (e.g., vision sensors) for obstacle avoidance in an indoor environment. For example, PIR sensors may be utilized in areas in which vision sensors do not work. PIR sensors may be able to detect and avoid obstacles regardless of lighting conditions in an environment (e.g., indoor environment).

In some instances, one or more PIR sensors coupled to the UAV 852 may detect obstacles in an indoor environment 850. In some instances, the PIR sensors may be configured to selectively detect and recognize obstacles, such as human obstacles. For example, the PIR sensors may be able to differentiate certain obstacles from different types of obstacles based on a heat signal (e.g., infrared radiation) emitted by the obstacles. PIR sensors or one or more processors coupled to the PIR sensor may further calculate or determine a distance from the UAV to the obstacle based on data from the PIR sensor and determine whether to effect a collision avoidance maneuver as previously described herein.

The embodiments provided herein may enable use of low cost pyroelectric infrared sensors for collision avoidance (e.g., human collision avoidance) for movable objects such as UAVs. The use of PIR sensors for collision avoidance may be used alternatively to, or in conjunction with other sensors such as vision sensors (e.g., stereo vision sensor) or Lidar sensors (e.g., 3D Lidar sensor) to avoid contact of UAVs with obstacles such as humans. The PIR sensors as used herein may be utilized both in indoor and outdoor environments for obstacle avoidance and may require relatively simple algorithms and may be used with a variety of processors (e.g., cheap processors, processors with low processing power, etc) in order to effect human collision avoidance. The PIR sensors may comprise filters to selectively detect or recognize obstacles and appropriate flight response measures may be implemented (e.g., only in regards to select or predetermined types of obstacles such as animals or humans).

The embodiments provided herein can be applied to various types of UAVs. For instance, the UAV may be a small-scale UAV that weighs no more than 10 kg and/or has a maximum dimension of no more than 1.5 m. In some embodiments, the UAV may be a rotorcraft, such as a multi-rotor aircraft that is propelled to move through the air by a plurality of propellers (e.g., a quadcopter). Additional examples of UAVs and other movable objects suitable for use with the embodiments presented herein are described in further detail below.

The UAVs described herein can be operated completely autonomously (e.g., by a suitable computing system such as an onboard controller), semi-autonomously, or manually (e.g., by a human user). The UAV can receive commands from a suitable entity (e.g., human user or autonomous control system) and respond to such commands by performing one or more actions. For example, the UAV can be controlled to take off from the ground, move within the air (e.g., with up to three degrees of freedom in translation and up to three degrees of freedom in rotation), move to target location or to a sequence of target locations, hover within the air, land on the ground, and so on. As another example, the UAV can be controlled to move at a specified velocity and/or acceleration (e.g., with up to three degrees of freedom in translation and up to three degrees of freedom in rotation) or along a specified movement path. Furthermore, the commands can be used to control one or more UAV components, such as the components described herein (e.g., sensors, actuators, propulsion units, payload, etc.). For instance, some commands can be used to control the position, orientation, and/or operation of a UAV payload such as a camera. Optionally, the UAV can be configured to operate in accordance with one or more predetermined operating rules. The operating rules may be used to control any suitable aspect of the UAV, such as the position (e.g., latitude, longitude, altitude), orientation (e.g., roll, pitch yaw), velocity (e.g., translational and/or angular), and/or acceleration (e.g., translational and/or angular) of the UAV. For instance, the operating rules can be designed such that the UAV is not permitted to fly beyond a threshold height, e.g., the UAV can be configured to fly at a height of no more than 400 m from the ground. In some embodiments, the operating rules can be adapted to provide automated mechanisms for improving UAV safety and preventing safety incidents. For example, the UAV can be configured to detect a restricted flight region (e.g., an airport) and not fly within a predetermined distance of the restricted flight region, thereby averting potential collisions with aircraft and other obstacles.

The systems, devices, and methods described herein can be applied to a wide variety of movable objects. As previously mentioned, any description herein of a UAV may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. The movable object may be a self-propelled unmanned vehicle that does not require human input. In some embodiments, the movable object can be mounted on a living subject, such as a human or an animal. Suitable animals can include avians, canines, felines, equines, bovines, ovines, porcines, delphines, rodents, or insects. In some embodiments, the movable object may be carried.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 9:
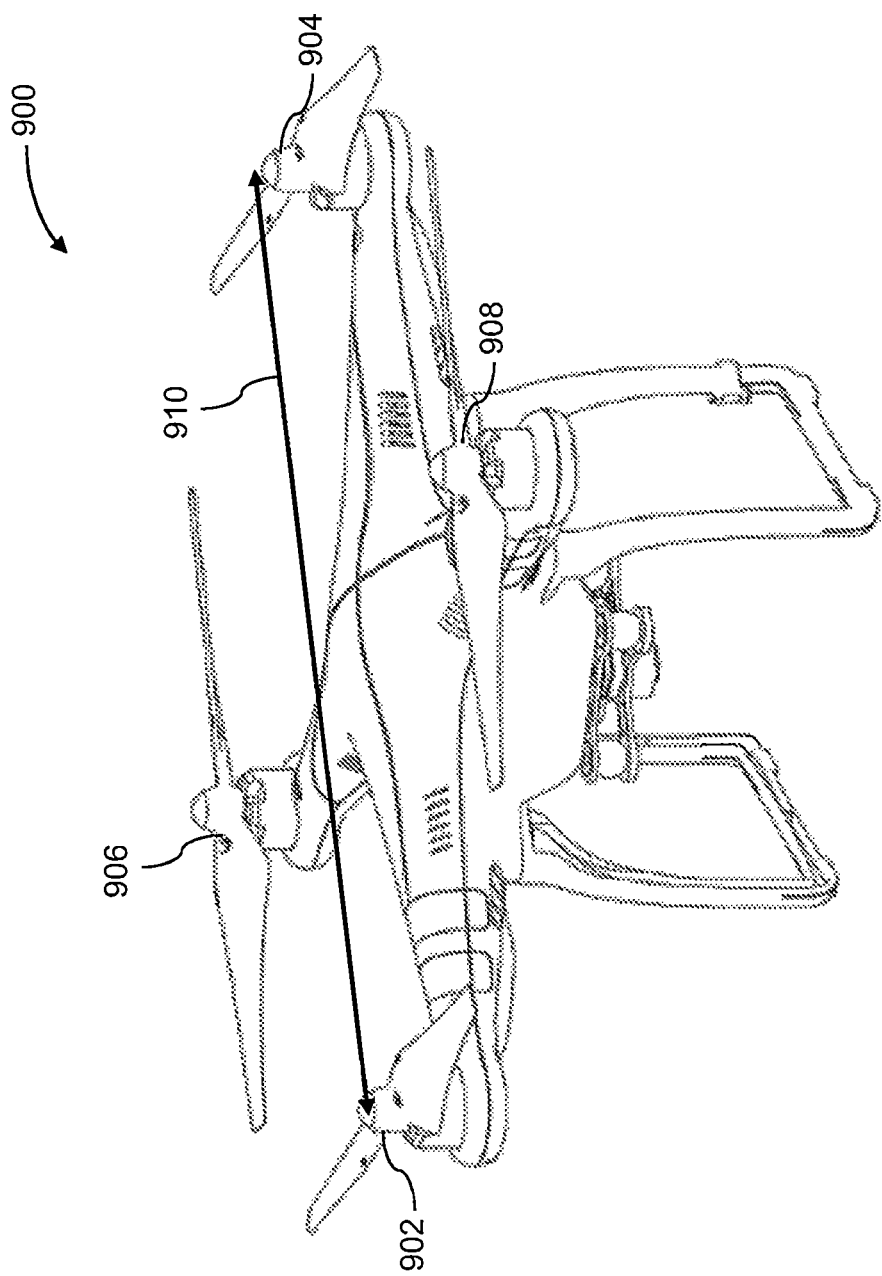
FIG. 9 illustrates an unmanned aerial vehicle (UAV), in accordance with embodiments.

FIG. 9 illustrates an unmanned aerial vehicle (UAV) 900, in accordance with embodiments. The UAV may be an example of a movable object as described herein. The UAV 900 can include a propulsion system having four rotors 902, 904, 906, and 908. Any number of rotors may be provided (e.g., one, two, three, four, five, six, seven, eight, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 910. For example, the length 910 can be less than or equal to 2 m, or less than equal to 5 m. In some embodiments, the length 910 can be within a range from 40 cm to 1 m, from 10 cm to 2 m, or from 5 cm to 5 m. Any description herein of a UAV may apply to a movable object, such as a movable object of a different type, and vice versa.

In some embodiments, a UAV or other movable objects can be adapted to carry one or more sensors. The one or more sensors may be configured to collect relevant data, such as information relating to the UAV's state, the surrounding environment, or the objects and obstacles within the environment. The relevant data may be analyzed, processed, or be used in further applications. For example, based on the relevant data that is collected, it can be possible to generate control signals for controlling UAV navigation.

Exemplary sensors suitable for use with the embodiments disclosed herein include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors).

Any suitable number and combination of sensors can be used, such as one, two, three, four, five, six, seven, eight, or more sensors. Optionally, the data can be received from sensors of different types (e.g., two, three, four, five, six, seven, eight, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). In some instances, the local coordinate system may be a body coordinate system that is defined relative to the UAV.

The sensors can be configured to collect various types of data, such as data relating to the UAV, the surrounding environment, or objects within the environment. For example, at least some of the sensors may be configured to provide data regarding a state of the UAV. The state information provided by a sensor can include information regarding a spatial disposition of the UAV (e.g., location or position information such as longitude, latitude, and/or altitude; orientation or attitude information such as roll, pitch, and/or yaw). The state information can also include information regarding motion of the UAV (e.g., translational velocity, translational acceleration, angular velocity, angular acceleration, etc.). A sensor can be configured, for instance, to determine a spatial disposition and/or motion of the UAV with respect to up to six degrees of freedom (e.g., three degrees of freedom in position and/or translation, three degrees of freedom in orientation and/or rotation). The state information may be provided relative to a global coordinate system or relative to a local coordinate system. A global coordinate system may refer to a coordinate system independent to a location of the UAV or another entity. A local coordinate system may refer to a coordinate system relative to the UAV or another entity. For example, a sensor can be configured to determine the distance between the UAV and the user controlling the UAV, or the distance between the UAV and the starting point of flight for the UAV. In some instances, a sensor can be configured to determine the distance between the UAV and an object near the UAV.

The data obtained by the sensors may provide various types of environmental information. For example, the sensor data may be indicative of an environment type, such as an indoor environment, outdoor environment, low altitude environment, or high altitude environment. The sensor data may also provide information regarding current environmental conditions, including weather (e.g., clear, rainy, snowing), visibility conditions, wind speed, time of day, and so on. Furthermore, the environmental information collected by the sensors may include information regarding the objects in the environment, such as the obstacles described herein or landmarks that are recognizable by a processor. Obstacle information may include information regarding the number, density, geometry, spatial disposition, movement, trajectory, and/or velocity of obstacles in the environment.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 10:
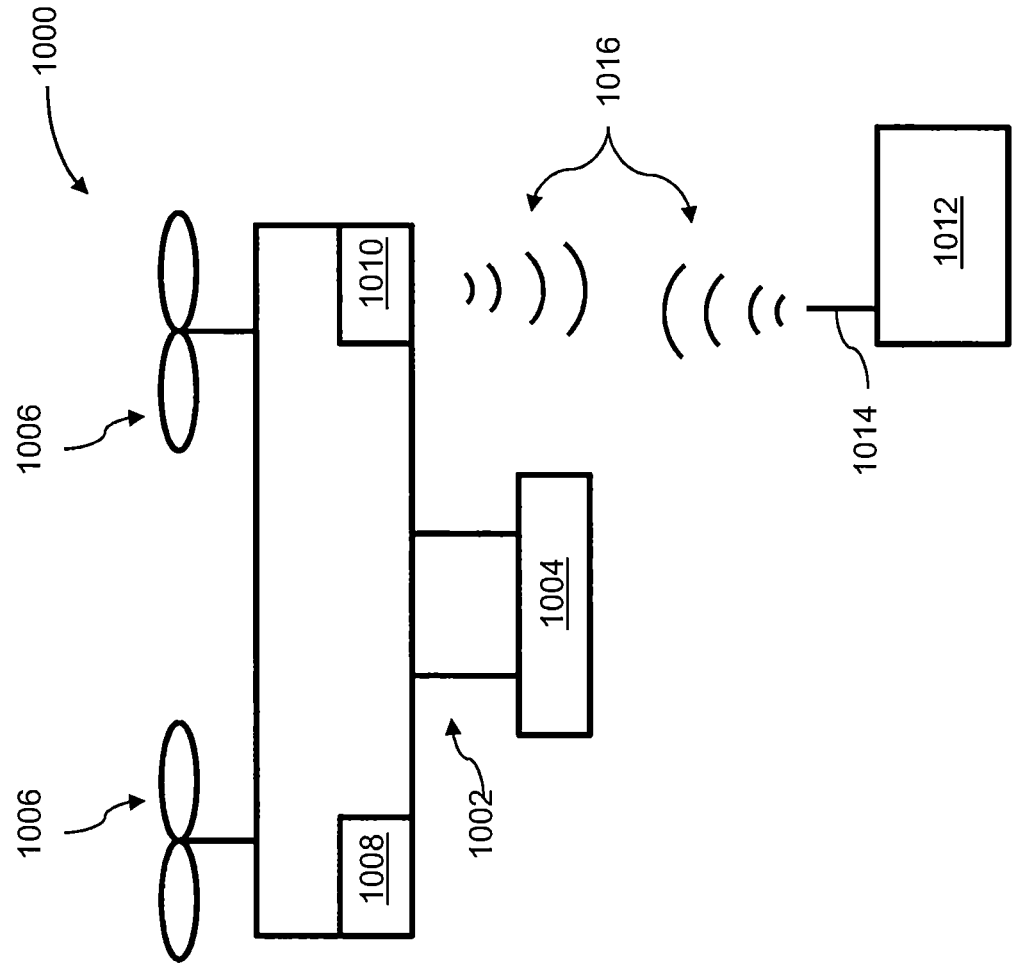
FIG. 10 illustrates a movable object including a carrier and a payload, in accordance with embodiments.

FIG. 10 illustrates a movable object 1000 including a carrier 1002 and a payload 1004, in accordance with embodiments. Although the movable object 1000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1004 may be provided on the movable object 1000 without requiring the carrier 1002. The movable object 1000 may include propulsion mechanisms 1006, a sensing system 1008, and a communication system 1010.

The propulsion mechanisms 1006 can include one or more of rotors, propellers, blades, engines, motors, wheels, axles, magnets, or nozzles, as previously described. For example, the propulsion mechanisms 1006 may be rotor assemblies or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1006 can be mounted on the movable object 1000 using any suitable means, such as a support element (e.g., a drive shaft) as described elsewhere herein.

The propulsion mechanisms 1006 can be mounted on any suitable portion of the movable object 1000, such on the top, bottom, front, back, sides, or suitable combinations thereof.

In some embodiments, the propulsion mechanisms 1006 can enable the movable object 1000 to take off vertically from a surface or land vertically on a surface without requiring any horizontal movement of the movable object 1000 (e.g., without traveling down a runway). Optionally, the propulsion mechanisms 1006 can be operable to permit the movable object 1000 to hover in the air at a specified position and/or orientation. One or more of the propulsion mechanisms 1000 may be controlled independently of the other propulsion mechanisms. Alternatively, the propulsion mechanisms 1000 can be configured to be controlled simultaneously. For example, the movable object 1000 can have multiple horizontally oriented rotors that can provide lift and/or thrust to the movable object. The multiple horizontally oriented rotors can be actuated to provide vertical takeoff, vertical landing, and hovering capabilities to the movable object 1000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1000 (e.g., with respect to up to three degrees of translation and up to three degrees of rotation).

The sensing system 1008 can include one or more sensors that may sense the spatial disposition, velocity, and/or acceleration of the movable object 1000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1008 can be used to control the spatial disposition, velocity, and/or orientation of the movable object 1000 (e.g., using a suitable processing unit and/or control module, as described below). Alternatively, the sensing system 1008 can be used to provide data regarding the environment surrounding the movable object, such as weather conditions, proximity to potential obstacles, location of geographical features, location of manmade structures, and the like.

The communication system 1010 enables communication with terminal 1012 having a communication system 1014 via wireless signals 1016. The communication systems 1010, 1014 may include any number of transmitters, receivers, and/or transceivers suitable for wireless communication. The communication may be one-way communication, such that data can be transmitted in only one direction. For example, one-way communication may involve only the movable object 1000 transmitting data to the terminal 1012, or vice-versa. The data may be transmitted from one or more transmitters of the communication system 1010 to one or more receivers of the communication system 1012, or vice-versa. Alternatively, the communication may be two-way communication, such that data can be transmitted in both directions between the movable object 1000 and the terminal 1012. The two-way communication can involve transmitting data from one or more transmitters of the communication system 1010 to one or more receivers of the communication system 1014, and vice-versa.

In some embodiments, the terminal 1012 can provide control data to one or more of the movable object 1000, carrier 1002, and payload 1004 and receive information from one or more of the movable object 1000, carrier 1002, and payload 1004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1006), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1008 or of the payload 1004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1012 can be configured to control a state of one or more of the movable object 1000, carrier 1002, or payload 1004. Alternatively or in combination, the carrier 1002 and payload 1004 can also each include a communication module configured to communicate with terminal 1012, such that the terminal can communicate with and control each of the movable object 1000, carrier 1002, and payload 1004 independently.

In some embodiments, the movable object 1000 can be configured to communicate with another remote device in addition to the terminal 1012, or instead of the terminal 1012. The terminal 1012 may also be configured to communicate with another remote device as well as the movable object 1000. For example, the movable object 1000 and/or terminal 1012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1000, receive data from the movable object 1000, transmit data to the terminal 1012, and/or receive data from the terminal 1012. Optionally, the remote device can be connected to the Internet or other telecommunications network, such that data received from the movable object 1000 and/or terminal 1012 can be uploaded to a website or server.

Figure 11:
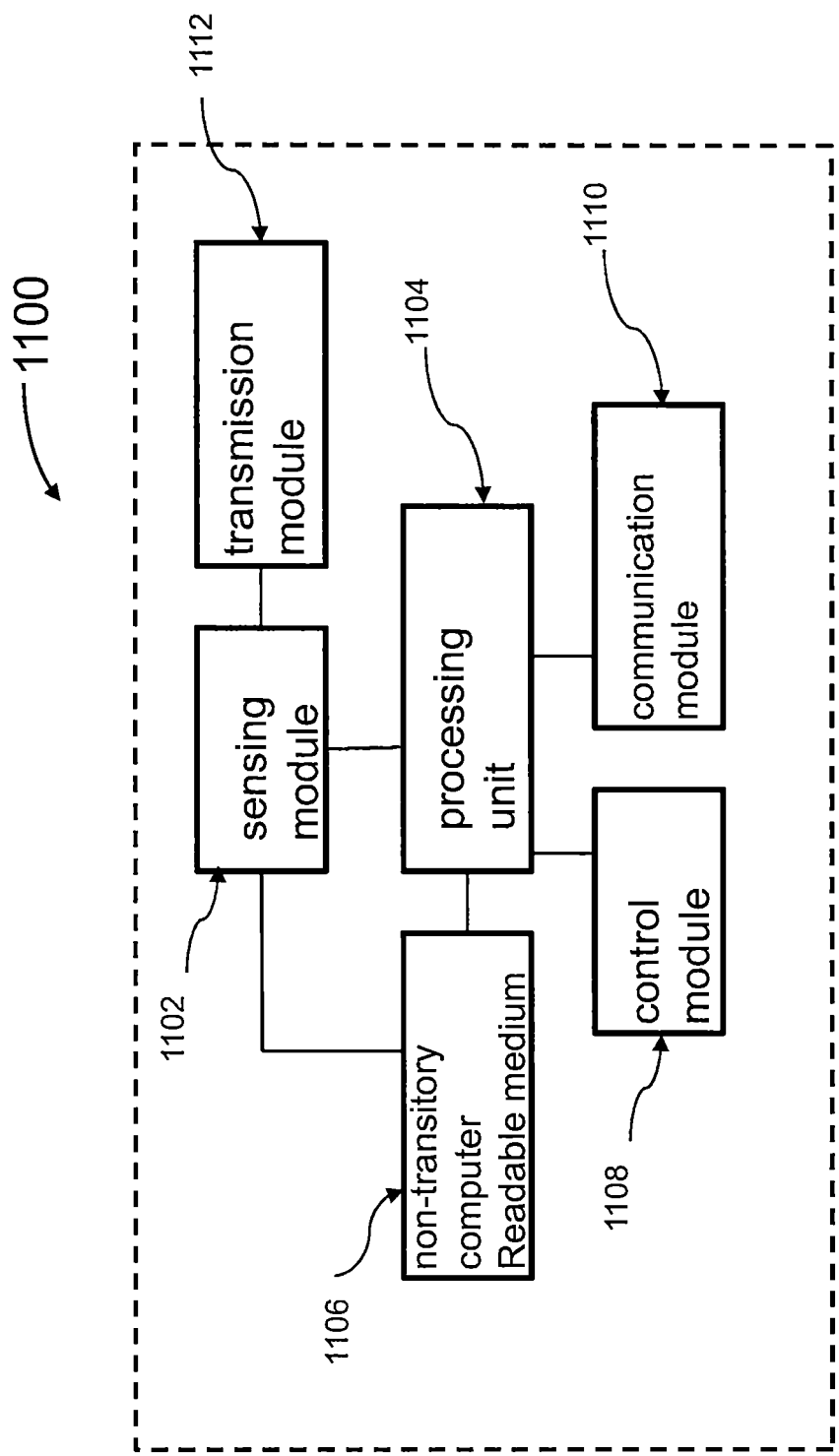
FIG. 11 illustrates a schematic illustration by way of block diagram of a system for controlling a movable object, in accordance with embodiments.

FIG. 11 is a schematic illustration by way of block diagram of a system 1100 for controlling a movable object, in accordance with embodiments. The system 1100 can be used in combination with any suitable embodiment of the systems, devices, and methods disclosed herein. The system 1100 can include a sensing module 1102, processing unit 1104, non-transitory computer readable medium 1106, control module 1108, and communication module 1110.

The sensing module 1102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1102 can be operatively coupled to a processing unit 1104 having a plurality of processors. In some embodiments, the sensing module can be operatively coupled to a transmission module 1112 (e.g., a Wi-Fi image transmission module) configured to directly transmit sensing data to a suitable external device or system. For example, the transmission module 1112 can be used to transmit images captured by a camera of the sensing module 1102 to a remote terminal.

The processing unit 1104 can have one or more processors, such as a programmable processor (e.g., a central processing unit (CPU)). The processing unit 1104 can be operatively coupled to a non-transitory computer readable medium 1106. The non-transitory computer readable medium 1106 can store logic, code, and/or program instructions executable by the processing unit 1104 for performing one or more steps. The non-transitory computer readable medium can include one or more memory units (e.g., removable media or external storage such as an SD card or random access memory (RAM)). In some embodiments, data from the sensing module 1102 can be directly conveyed to and stored within the memory units of the non-transitory computer readable medium 1106. The memory units of the non-transitory computer readable medium 1106 can store logic, code and/or program instructions executable by the processing unit 1104 to perform any suitable embodiment of the methods described herein. For example, the processing unit 1104 can be configured to execute instructions causing one or more processors of the processing unit 1104 to analyze sensing data produced by the sensing module. The memory units can store sensing data from the sensing module to be processed by the processing unit 1104. In some embodiments, the memory units of the non-transitory computer readable medium 1106 can be used to store the processing results produced by the processing unit 1104.

In some embodiments, the processing unit 1104 can be operatively coupled to a control module 1108 configured to control a state of the movable object. For example, the control module 1108 can be configured to control the propulsion mechanisms of the movable object to adjust the spatial disposition, velocity, and/or acceleration of the movable object with respect to six degrees of freedom. Alternatively or in combination, the control module 1108 can control one or more of a state of a carrier, payload, or sensing module.

The processing unit 1104 can be operatively coupled to a communication module 1110 configured to transmit and/or receive data from one or more external devices (e.g., a terminal, display device, or other remote controller). Any suitable means of communication can be used, such as wired communication or wireless communication. For example, the communication module 1110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1110 can transmit and/or receive one or more of sensing data from the sensing module 1102, processing results produced by the processing unit 1104, predetermined control data, user commands from a terminal or remote controller, and the like.

The components of the system 1100 can be arranged in any suitable configuration. For example, one or more of the components of the system 1100 can be located on the movable object, carrier, payload, terminal, sensing system, or an additional external device in communication with one or more of the above. Additionally, although FIG. 11 depicts a single processing unit 1104 and a single non-transitory computer readable medium 1106, one of skill in the art would appreciate that this is not intended to be limiting, and that the system 1100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1100 can occur at one or more of the aforementioned locations.

As used herein A and/or B encompasses one or more of A or B, and combinations thereof such as A and B.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An apparatus for detecting an obstacle, said apparatus comprising:
    a plurality of passive infrared sensors on board a movable object and including:
        a first passive infrared sensor having a first detection range and a first field of view; and
        two or more second passive infrared sensors each having a second detection range and a second field of view, the second detection range being longer than the first detection range, and the second field of view being smaller than the first field of view; and
    one or more processors, collectively or individually configured to:
        receive a signal from at least one passive infrared sensor of said plurality indicative of a heat signal from the obstacle;
        recognize the obstacle based on the heat signal; and
        determine whether to effect a collision avoidance maneuver for the movable object to avoid the obstacle.

2. The apparatus of claim 1, wherein the one or more processors are configured to determine whether to effect the collision avoidance maneuver based on a speed and direction of the movable object and/or the obstacle.

3. The apparatus of claim 1, wherein the collision avoidance maneuver includes braking, altering a direction of a moving course of the movable object, stopping one or more propulsion units of the movable object, deploying one or more airbags and/or deploying one or more parachutes.

4. The apparatus of claim 1, wherein a collective field of view of the plurality of infrared sensors covers a 360 angle around the movable object.

5. The apparatus of claim 1, wherein the one or more processors are further configured to detect a peak value of an output signal of the passive infrared sensor and calculate or determine a distance based on a calibration curve showing a relationship between distances and peak values.

6. The apparatus of claim 5, wherein a distance from the movable object to the obstacle at time points subsequent to a first detection of the obstacle is determined.

7. The apparatus of claim 1, wherein the first passive infrared sensor is located on an upper surface of the movable object.

8. The apparatus of claim 1, wherein each of the two or more second passive infrared sensors is located on one of lateral sides of the movable object.

9. The apparatus of claim 1, wherein:
the first field of view of the first passive infrared sensor covers a 360° angle; and
the second fields of view of the two or more second passive infrared sensors collectively cover a 360° angle.

10. The apparatus of claim 1, wherein:
the collision avoidance maneuver is a first collision avoidance maneuver; and
the one or more processors are further configured to:
determine a distance to the obstacle based on the heat signal;
determine whether the distance is within a threshold distance;
effect the first collision avoidance maneuver for the movable object to avoid the obstacle in response to determining that the distance is within the threshold distance; and
effect a second collision avoidance maneuver for the movable object to avoid the obstacle in response to determining that the distance is outside the threshold distance, the second collision avoidance maneuver being different from the first collision avoidance maneuver.

* * * * *